United States Patent [19]

Ng

[11] Patent Number: 5,025,322
[45] Date of Patent: Jun. 18, 1991

[54] METHOD AND APPARATUS FOR GREY LEVEL RECORDING USING MULTIPLE ADDRESSABILITY

[75] Inventor: Yee S. Ng, Fairport, N.Y.

[73] Assignee: Eastman Kodak Company, Rochester, N.Y.

[21] Appl. No.: 453,421

[22] Filed: Dec. 18, 1989

[51] Int. Cl.[5] .................. H04N 1/21; G01D 15/14
[52] U.S. Cl. .................. 358/298; 346/107 R; 358/302
[58] Field of Search .......... 358/298, 300, 302; 346/160, 107 R, 108, 76 PH, 155

[56] References Cited

U.S. PATENT DOCUMENTS

| | | | |
|---|---|---|---|
| 4,400,738 | 8/1983 | Tomory | 358/298 |
| 4,443,121 | 4/1984 | Arai | 346/76 PH |
| 4,455,578 | 6/1984 | Fearnside | 358/302 |
| 4,525,729 | 6/1985 | Agulnek | 358/298 |
| 4,661,859 | 4/1987 | Mailloux | 358/298 |
| 4,679,096 | 6/1987 | Nagashima | 358/298 |
| 4,712,116 | 12/1987 | Reinten | 346/107 R |
| 4,750,010 | 6/1988 | Ayers et al. | 346/107 R |
| 4,819,008 | 4/1989 | Nagato | 346/76 PH |
| 4,835,551 | 5/1989 | Ng | 346/160 |
| 4,837,587 | 6/1989 | Ng | 346/108 |

Primary Examiner—George H. Miller, Jr.
Assistant Examiner—Scott A. Rogers
Attorney, Agent, or Firm—Norman Rushefsky

[57] ABSTRACT

A grey level non-impact recording apparatus and method provides data signals to a recording head having N recording elements per inch so that M sub-lines per inch can be recorded, wherein M is greater than N. In a specific example of a 400 dpi LED printhead, grey level data is sent to the printhead at a rate to record say 2400 lines per inch to provide a resolution of 400 dpi×2400 dpi grey level sub-pixels. Data from a data source may have a pixel resolution of 1/400"×1/400" and the apparatus employs six sub-lines to record each of these pixels. The control for controlling the duration of recording of each LED for each sub-line includes a comparator which receives a grey level data signal at one input terminal and pulses representing a time changing count at another terminal. The count is produced by counter means and changes in response to signals from a clock means. Fine control over exposure, particularly at the "toe" of the exposure curve, is provided by a vernier-like clocking scheme wherein the counter means responds to alternate master clocks during recording of alternate sub-lines. The master clocks generate clock pulses at slightly different frequencies which thereby affect fine differences in the timing of the pulses from the counter means. In one embodiment the clock means may be a programmable non-linear clock and provides a greater range of grey level recording.

27 Claims, 30 Drawing Sheets

REGULAR EXPOSURE CLOCK (8MHz PRINTHEAD), 40 MHz MASTER CLOCK, CENTER-PULSE-WIDTH MODULATION

MULTIPLE ADDRESS GRAY LEVEL PRINTING WITH VERNIER CLOCK, 40 MHz AND 38.46 MHz MASTER CLOCK, ENABLES (T40a+T38a)≥(T40b+T38b) BY 2ns

| | A | B | C | D | E | F | G | H | I | J | K | L | M |
|---|---|---|---|---|---|---|---|---|---|---|---|---|---|
| 1 | | | | | | | | | | | | | |
| 2 | VERNIER CLOCK WITH THE POSSIBLE STATES (CLOCK CYCLES AVAILABLE) | | | | | | | | | | | | |
| 3 | 40 MHz CLOCK | | | | | | | | | | | | |
| 4 | CLOCK CYCLES | 50 | 52 | 54 | 56 | 58 | 60 | 62 | 64 | 66 | 68 | 70 | 72 |
| 5 | EXPOSURE TIME IN ns | 1250 | 1300 | 1350 | 1400 | 1450 | 1500 | 1550 | 1600 | 1650 | 1700 | 1750 | 1800 |
| 6 | CLOCK CYCLES | 74 | 76 | 78 | 80 | 82 | 84 | 86 | 88 | 90 | 92 | 94 | 96 |
| 7 | EXPOSURE TIME IN ns | 1850 | 1900 | 1950 | 2000 | 2050 | 2100 | 2150 | 2200 | 2250 | 2300 | 2350 | 2400 |
| 8 | CLOCK CYCLES | 98 | 100 | 102 | 104 | 106 | 108 | 110 | 112 | 114 | 116 | 118 | 120 |
| 9 | EXPOSURE TIME IN ns | 2450 | 2500 | 2550 | 2600 | 2650 | 2700 | 2750 | 2800 | 2850 | 2900 | 2950 | 3000 |
| 10 | CLOCK CYCLES | 122 | 124 | 126 | 128 | 130 | 132 | 134 | 136 | 138 | 140 | 142 | 144 |
| 11 | EXPOSURE TIME IN ns | 3050 | 3100 | 3150 | 3200 | 3250 | 3300 | 3350 | 3400 | 3450 | 3500 | 3550 | 3600 |
| 12 | CLOCK CYCLES | 146 | 148 | 150 | 152 | 154 | 156 | 158 | 160 | 162 | 164 | 166 | 168 |
| 13 | EXPOSURE TIME IN ns | 3650 | 3700 | 3750 | 3800 | 3850 | 3900 | 3950 | 4000 | 4050 | 4100 | 4150 | 4200 |
| 14 | CLOCK CYCLES | 170 | 172 | 174 | 176 | 178 | 180 | 182 | 184 | 186 | 188 | 190 | 192 |
| 15 | EXPOSURE TIME IN ns | 4250 | 4300 | 4350 | 4400 | 4450 | 4500 | 4550 | 4600 | 4650 | 4700 | 4750 | 4800 |
| 16 | CLOCK CYCLES | 194 | 196 | 198 | 200 | | | | | | | | |
| 17 | EXPOSURE TIME IN ns | 4850 | 4900 | 4950 | 5000 | | | | | | | | |
| 18 | | | | | | | | | | | | | |
| 19 | | | | | | | | | | | | | |
| 20 | 38.46 MHz | | | | | | | | | | | | |
| 21 | CLOCK CYCLES | 50 | 52 | 54 | 56 | 58 | 60 | 62 | 64 | 66 | 68 | 70 | 72 |
| 22 | EXPOSURE TIME IN ns | 1300 | 1352 | 1404 | 1456 | 1508 | 1560 | 1612 | 1664 | 1716 | 1768 | 1820 | 1872 |
| 23 | CLOCK CYCLES | 74 | 76 | 78 | 80 | 82 | 84 | 86 | 88 | 90 | 92 | 94 | 96 |
| 24 | EXPOSURE TIME IN ns | 1924 | 1976 | 2028 | 2080 | 2132 | 2184 | 2236 | 2288 | 2340 | 2392 | 2444 | 2496 |
| 25 | CLOCK CYCLES | 98 | 100 | 102 | 104 | 106 | 108 | 110 | 112 | 114 | 116 | 118 | 120 |
| 26 | EXPOSURE TIME IN ns | 2548 | 2600 | 2652 | 2704 | 2756 | 2808 | 2860 | 2912 | 2964 | 3016 | 3068 | 3120 |
| 27 | CLOCK CYCLES | 122 | 124 | 126 | 128 | 130 | 132 | 134 | 136 | 138 | 140 | 142 | 144 |
| 28 | EXPOSURE TIME IN ns | 3172 | 3224 | 3276 | 3328 | 3380 | 3432 | 3484 | 3536 | 3588 | 3640 | 3692 | 3744 |
| 29 | CLOCK CYCLES | 146 | 148 | 150 | 152 | 154 | 156 | 158 | 160 | 162 | 164 | 166 | 168 |
| 30 | EXPOSURE TIME IN ns | 3796 | 3848 | 3900 | 3952 | 4004 | 4056 | 4108 | 4160 | 4212 | 4264 | 4316 | 4368 |
| 31 | CLOCK CYCLES | 170 | 172 | 174 | 176 | 178 | 180 | 182 | 184 | 186 | 188 | 190 | 192 |
| 32 | EXPOSURE TIME IN ns | 4420 | 4472 | 4524 | 4576 | 4628 | 4680 | 4732 | 4784 | 4836 | 4888 | 4940 | 4992 |
| 33 | CLOCK CYCLES | 194 | 196 | 198 | 200 | | | | | | | | |
| 34 | EXPOSURE TIME IN ns | 5044 | 5096 | 5148 | 5200 | | | | | | | | |

FIG. 19

| | A | B | C | D | E | F | G | H | I | J | K | L | M |
|---|---|---|---|---|---|---|---|---|---|---|---|---|---|
| 1 | | | | | | | | | | | | | |
| 2 | VERNIER CLOCK WITH THE POSSIBLE STATES IN THE MULTIPLE LINES 6 AND 8 MHz PRINTHEAD | | | | | | | | | | | | |
| 3 | | | | | | | | | | | | | |
| 4 | 40 MHz CLOCK | | | | | | | | | | | | |
| 5 | LINE 1 CLOCK CYCLES | 50 | 62 | 74 | 86 | 98 | 110 | 122 | 134 | 146 | 158 | 170 | 182 |
| 6 | EXP TIME IN ns | 1250 | 1550 | 1850 | 2150 | 2450 | 2750 | 3050 | 3350 | 3650 | 3950 | 4250 | 4550 |
| 7 | LINE 2 CLOCK CYCLES | 54 | 66 | 78 | 90 | 102 | 114 | 126 | 138 | 150 | 162 | 174 | 186 |
| 8 | EXP TIME IN ns | 1350 | 1650 | 1950 | 2250 | 2550 | 2850 | 3150 | 3450 | 3750 | 4050 | 4350 | 4650 |
| 9 | LINE 3 CLOCK CYCLES | 58 | 70 | 82 | 94 | 106 | 118 | 130 | 142 | 154 | 166 | 178 | 190 |
| 10 | EXP TIME IN ns | 1450 | 1750 | 2050 | 2350 | 2650 | 2950 | 3250 | 3550 | 3850 | 4150 | 4450 | 4750 |
| 11 | | | | | | | | | | | | | |
| 12 | | | | | | | | | | | | | |
| 13 | 38.46 MHz CLOCK | | | | | | | | | | | | |
| 14 | LINE 1 CLOCK CYCLES | 50 | 62 | 74 | 86 | 98 | 110 | 122 | 134 | 146 | 158 | 170 | 182 |
| 15 | EXP TIME IN ns | 1300 | 1612 | 1924 | 2236 | 2548 | 2860 | 3172 | 3484 | 3796 | 4108 | 4420 | 4732 |
| 16 | LINE 2 CLOCK CYCLES | 54 | 66 | 78 | 90 | 102 | 114 | 126 | 138 | 150 | 162 | 174 | 186 |
| 17 | EXP TIME IN ns | 1404 | 1716 | 2028 | 2236 | 2652 | 2964 | 3276 | 3588 | 3900 | 4212 | 4524 | 4836 |
| 18 | LINE 3 CLOCK CYCLES | 58 | 70 | 82 | 94 | 106 | 118 | 130 | 142 | 154 | 166 | 178 | 190 |
| 19 | EXP TIME IN ns | 1508 | 1820 | 2132 | 2444 | 2756 | 3068 | 3380 | 3692 | 4004 | 4316 | 4628 | 4940 |

FIG. 20a

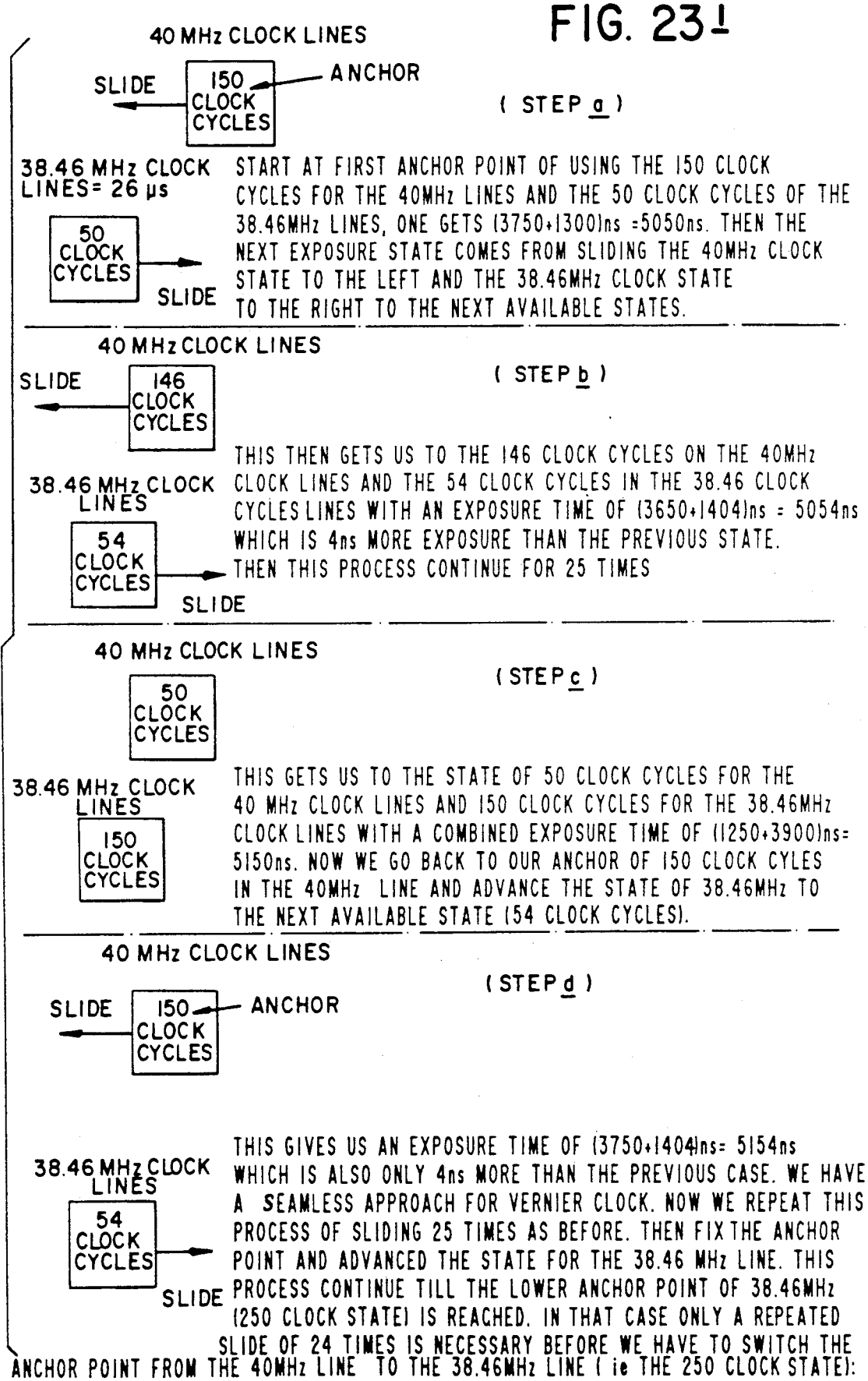
FIG. 23.1

FIG. 23²

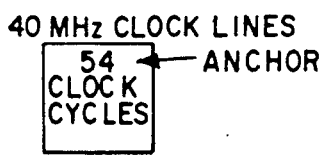

40 MHz CLOCK LINES — ANCHOR (STEP e)

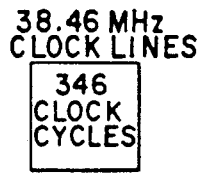

38.46 MHz CLOCK LINES

AT THAT POINT WE ARE AT THE 54 CLOCK CYCLE STATE OF THE 40 MHz LINE AND THE 346 CLOCK CYCLES OF THE 38.46 MHz LINE (1350+8996)ns = 10346 ns BEFORE THE SWITCHING OF THE ANCHOR

---

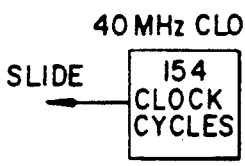

40 MHz CLOCK LINES
SLIDE ←

(STEP f)

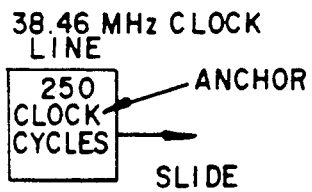

38.46 MHz CLOCK LINE
ANCHOR
SLIDE →

NOW WE HAVE A NEW ANCHOR AT 250 CLOCK CYCLES IN THE 38.46 MHz LINE THE NEW STARTING POINT FOR THE 40 MHz LINE IS AT 154 CLOCK CYCLES AND WE HAVE A COMBINED EXPOSURE OF (3850+6500)ns = 10350 ns WHICH IS 4 ns MORE THAN THE ONE ABOVE IT. NOW WE USE THE SAME METHOD AND SLIDE THE 40MHz LINE STATES TO THE LEFT AND THE 38.46 MHz STATES TO THE RIGHT. THIS WILL CONTINUE FOR 24 TIMES.

---

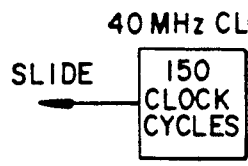

40 MHz CLOCK LINES
SLIDE ←

(STEP g)

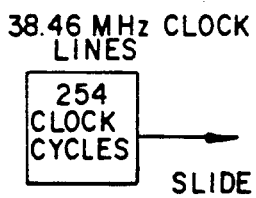

38.46 MHz CLOCK LINES
SLIDE →

AT THE FIRST SLIDE IT GETS US TO THE 150 CLOCK STATES ON THE 40 MHz LINE AND THE 254 CLOCK CYCLES IN THE 38.46 MHz LINE WHICH GIVES US AN EXPOSURE OF (3750+6604)ns = 10354ns. NOW WHEN THAT REPEAT FOR 24 TIMES WE GET TO THE 58 STATES FOR THE 40MHz LINE AND THE 346 STATE OF THE 38.46MHz LINE AS SHOWN BELOW.

---

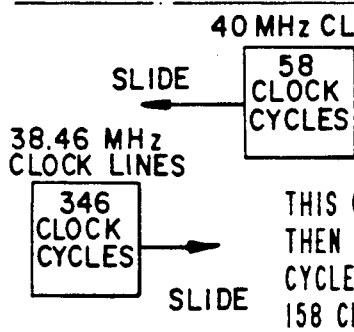

40 MHz CLOCK LINES
SLIDE ←

(STEP h)

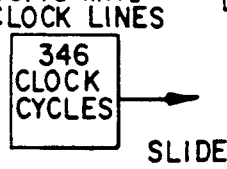

38.46 MHz CLOCK LINES
SLIDE →

THIS GIVES US A COMBINED EXPOSURE OF (1450+8996)ns =10446 THEN WE GO BACK TO THE 38.46MHz ANCHOR (250 CLOCK CYCLES)& ADVANCED THE STATE OF THE 40MHz LINE TO THE 158 CLOCK CYCLE.

FIG. 23³

40 MHz CLOCK LINES

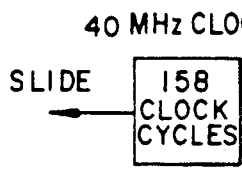

(STEP i)

38.46 MHz CLOCK LINES

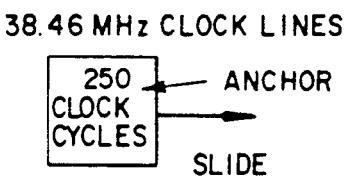

THIS GIVES US A COMBINED EXPOSURE OF (3950+6500)ns=10450ns. NOW WE CONTINUE OUR METHOD OF SLIDING THE 40 MHz STATES TO THE LEFT AND THE 38.46 MHz STATES TO THE RIGHT 24 TIMES UNTIL WE HAVE TO ANCHOR THE 38.46 MHz LINE AT 250 CLOCK STATE AND ADVANCE THE 40 MHz LINE STATE TO THE NEXT ONE UNTIL WE GET TO THE NEXT ANCHOR POINT FOR THE 40 MHz LINE (WHICH IS THE 350 CLOCK STATES). IN THAT CASE BEFORE THE SWITCHING OF THE ANCHOR POINT FROM THE 38.5 MHz LINE TO THE 40 MHz LINE, WE REPEAT THE LAST SLIDE 25 TIMES INSTEAD OF 24 TIMES. THIS GETS US TO THE 250 CLOCK STATES FOR THE 40 MHz LINE AND THE 350 CLOCK STATES FOR THE 38.46 MHz LINE.

40 MHz CLOCK LINES      (STEP j)

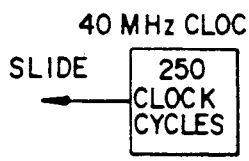

38.46 MHz CLOCK LINES

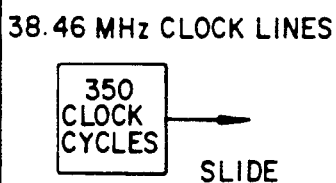

THIS GIVES US THE 250 CLOCK STATE ON THE 40 MHz LINE AND THE 350 CLOCK STATE OF THE 38.46 MHz LINE WITH AN EXPOSURE OF (6250+ 9100)ns = 15,350ns. NOW WE SWITCH OVER TO THE NEW ANCHOR OF THE 40 MHz AT 350 CLOCK CYCLE AND THE LOWER 38.46 MHz LINE WILL TAKE ON THE 254 CLOCK STATE TO GIVES A COMBINED EXPOSURE OF (8750 + 6604)ns= 15,354ns which IS 4ns MORE THAN THE STATE BEFORE THAT. NOW THE WHOLE PROCESS REPEAT ITSELF AGAIN WITH THE NEW ANCHOR UNTIL WE GET TO THE NEXT ANCHOR ETC.

EXPOSURE TIMING DIAGRAM FOR FIG. 23a

THE EXPOSURE TIMING DIAGRAM FOR FIG. 23b

VERNIER CLOCK APPPROACH IN MULTIPLE ADDRESS PRINTING WITH ONLY 2 SUB-LINES USED AT ONE TIME, TOTAL EXPOSURE TIME IS 38,502 ns.

VERNIER CLOCK WITH MULTIPLE ADDRESS PRINTING WITH 4 SUB-LINES BEING USED SIMULTANEOUSLY TO GET A TOTAL EXPOSURE TIME OF 38,504 ns.

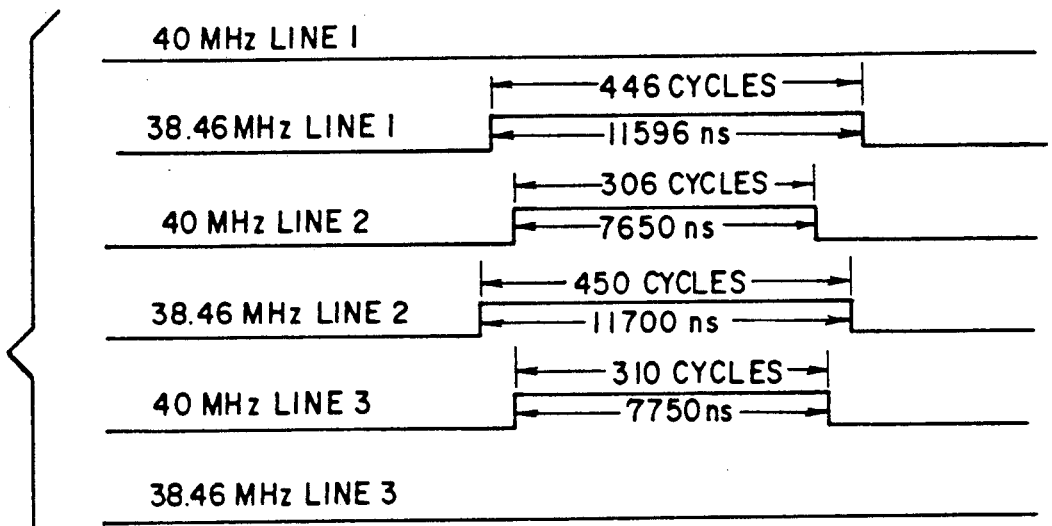

VERNIER CLOCK WITH MULTIPLE ADDRESS PRINTING WITH 4 SUB-LINES BEING USED SIMULTANEOUSLY TO GET A TOTAL EXPOSURE TIME OF 38,696 ns. THIS RESULTED FROM REPEATING THE OPERATION OF FIG.24e AND FIG.24f 24 TIMES, SO WE HAVE INCREASED OUR EXPOSURE TIME 192 ns FROM THAT OF FIG.24b. NOW WE NEED 4ns MORE BEFORE WE USE THE ANCHOR AND ADVANCE TECHNIQUE FOR THE NEXT 200 ns INCREMENT.

FIG. 24g

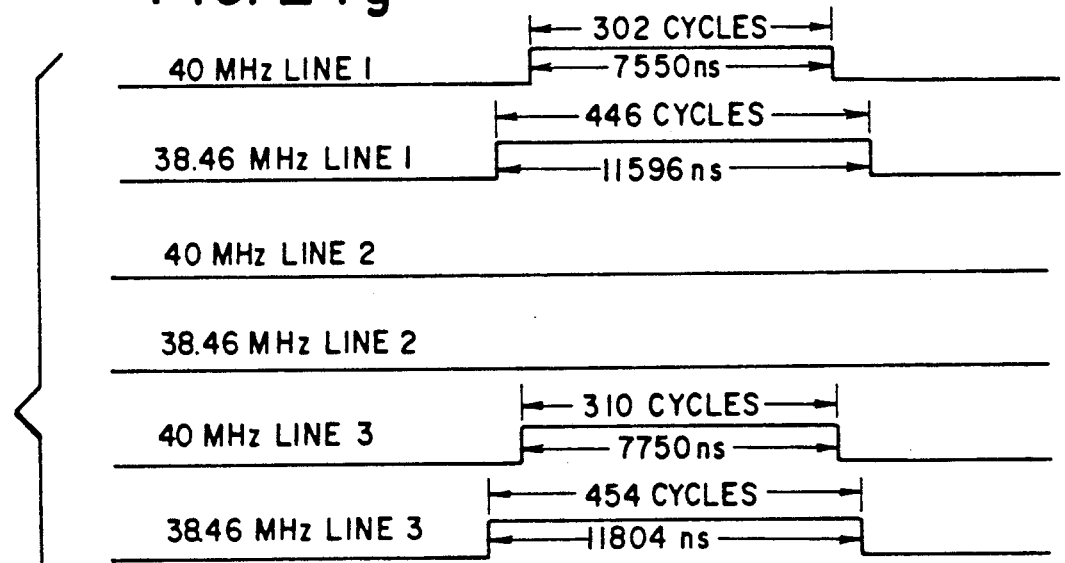

VERNIER CLOCK WITH MULTIPLE ADDRESS PRINTING WITH 4 SUB-LINES BEING USED SIMULTANEOUSLY TO GET A TOTAL EXPOSURE TIME OF 38,700 ns. THIS IS 4 ns MORE EXPOSURE THAN THAT IN FIGURE 24g. NOW WE ARE READY FOR THE NEXT STEP-ANCHOR/ADVANCE.

FIG. 24h

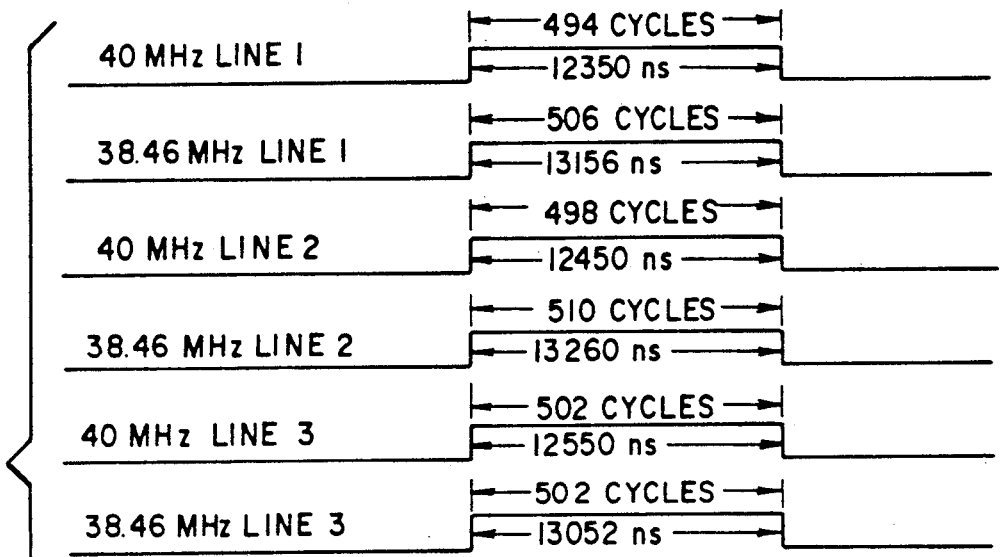

VERNIER CLOCK WITH MULTIPLE ADDRESS PRINTING WITH 6 SUB-LINES BEING USED SIMULTANEOUSLY TO GET A TOTAL EXPOSURE OF 76,818ns WHICH IS 12ns MORE THAN THAT IN FIG.24k. IT IS ACCOMPLISHED BY DECREMENTING ONE LINE ( LINE 1 OF THE 40MHz CLOCK LINE BY 12 CLOCK CYCLES OR 6 STATES ) AND INCREMENTING ONE OTHER LINE ( LINE 2 OF THE 38.46 MHz LINE BY 12 CLOCK CYCLES OR 6 STATES ) WHILE MAINTAINING THE REST THE SAME TO GAIN THAT 12ns. THIS WILL CONTINUE BY USING THE OTHER LINES IN A SEQUENTIAL MANNER UNTIL 25 TIMES LATER.

FIG. 24 l

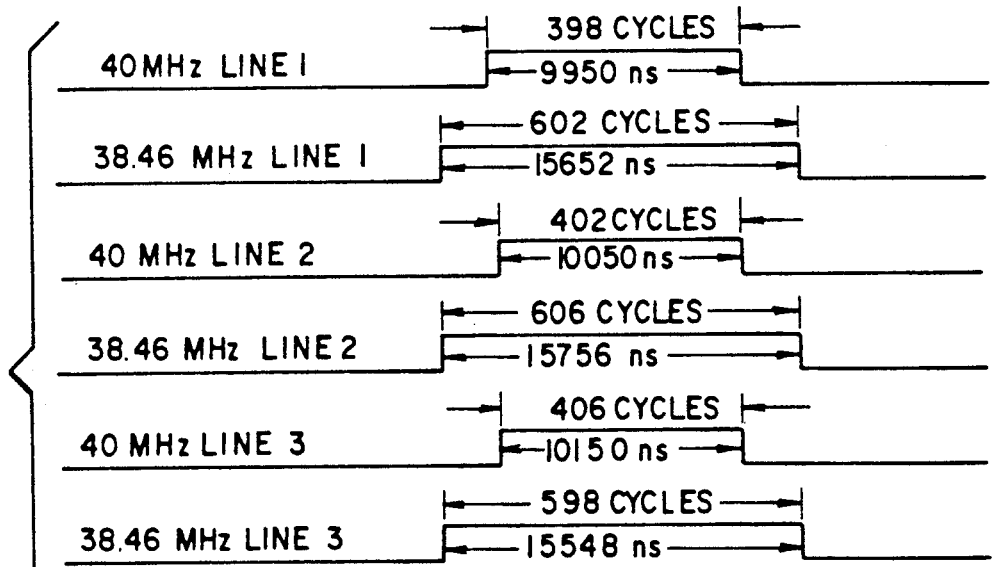

VERNIER CLOCK WITH MULTIPLE ADDRESS PRINTING WITH 6 SUB-LINES WITH A TOTAL EXPOSURE TIME OF 77,106 ns, NOW WE ARE READY FOR THE REANCHOR ( IN THE 40 MHz LINE AT 498, 502 AND 506 CYCLES AND ADVANCE THE STATES IN THE 38.46 MHz LINE )

FIG. 24 m

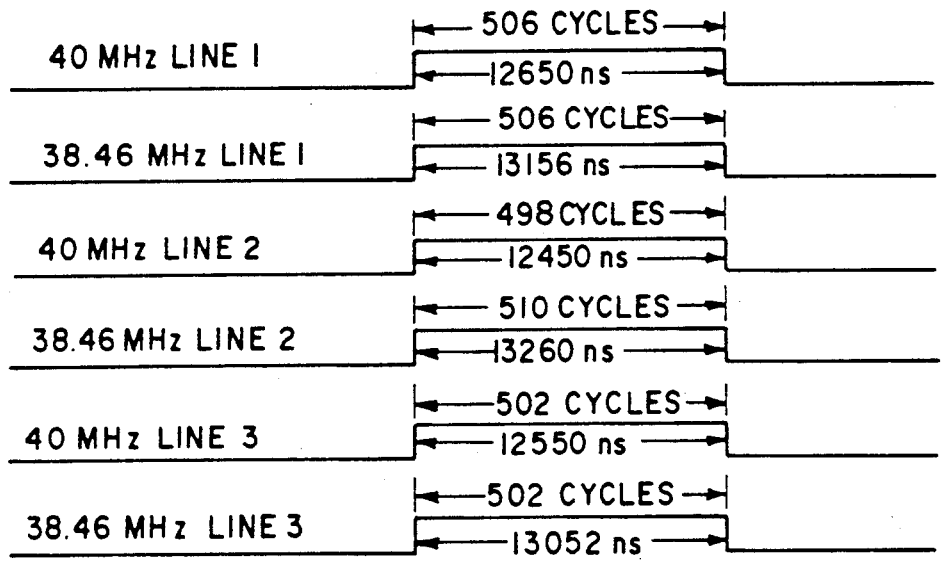

VERNIER CLOCK WITH MULTIPLE ADDRESS PRINTING
WITH 6 SUB-LINES RIGHT AFTER THE ADVANCE STEP FROM FIGURE 24m
THE TOTAL EXPOSURE TIME IS NOW 77,118ns WHICH IS 12ns MORE THAN
THAT IN FIGURE 24m. WE ARE NOW ANCHOR IN THE 40 MHz LINE AT THE
CLOCK STATES OF ( 498,502 AND 506) WHILE THE 38.46 MHz LINE HAS
ADVANCED THE CLOCK STATE OF THE LOWEST TIME ( 498 CLOCK STATES
IN LINE 2 TO 510 CLOCK STATE IN LINE 2 ) WHILE MAINTAINING THE
REST OF THE LINES AS THE SAME STATE AS IN FIGURE 24b. NOW WE
REPEAT THE SLIDING PROCESS AS IN FIGURE 24l THROUGH 24m.
THEN GO THROUGH SIMILAR PROCESS OF ANCHOR AND ADVANCE LIKE IN
FIGURE 24n. LATER ON WE REANCHOR LIKE THAT SHOWN IN FIGURE 24e
AND FIG.24f etc. THIS PROCEDURE CONTINUE UNTIL WE GET TO THE STATES
OF ( 698, 702, AND 706 IN THE 40 MHz LINE AND 794, 798 AND 802 FOR
THE 38.46 MHz LINE ). THIS GIVES US A TOTAL EXPOSURE OF 114,894ns.
WE GET 3174 EXPOSURE STATES FROM 76,806ns TO 114,894ns AT 12ns
QUANTIZATION.

FIG. 24n

METHOD AND APPARATUS FOR GREY LEVEL RECORDING USING MULTIPLE ADDRESSABILITY

CROSS-REFERENCE TO RELATED APPLICATIONS

This application is related to the following U.S. applications, filed concurrently herewith 1. Ser. No. 07/451,898 in the name of Eric Zeise and entitled "Improved Dot Printer and Method for Grey Level Recording."

2. Ser. No. 07/453,422 in the name of Roger A. Morton and entitled "Method and Apparatus for Grey Level Printing."

3. Ser. No. 07/451,907 in the name of Roger A. Morton and entitled "Method and Apparatus for Grey Level Printing with Amplitude and Pulsewidth Modulation."

BACKGROUND OF THE INVENTION

1. Field of the Invention

The present invention relates to a non-impact dot printer and method for printing halftone or continuous tone information and the like with small pixels (dots).

2. Description of the Prior Art

Various non-impact recording or printer heads for use as dot printers are known. Examples of such heads include an electrostatic printer head, an LED (light emitting diode) array printer head, ink-jet printer head, thermal printer head, etc. While the invention will find utility with regard to non-impact printers in general, discussion will be made herein with regard to LED printer heads with which the invention is particularly suited.

In U.S. Pat. No. 4,750,010 an LED printer is described in which a series of LED's arranged in a straight line are selectively activatable for brief periods to form dot-like images on a recording surface. One feature of this printer is that the signal pulses to all the selected LED's causing same to be activated during any one PEL period (picture element period or dot line period) are symmetrical about a center line. The term used to describe this arrangement of signals is "center pulse width modulated." The reasons for arranging such signals in this manner are described in the patent. In one embodiment of a printer head described in this patent, grey scale recording is achieved by having a digital comparator associated with each LED. At one input to the comparator, there is provided the data in the form of a plurality of digital data bits representing an exposure on-time for that LED for that PEL period. At a second input to the comparator, an input from an up-/down counter is provided that is rapidly changing in accordance with signals emitted from a high speed clock. As the counter output value decreases towards zero at some point in time a match is sensed by the comparator between the two inputs of the comparator (in accordance with its operating criterion). The LED then turns on and remains on for a very brief duration until a subsequent sensing of a match by the comparator occurs during a count-up phase of the counter. The above patent notes that the data may be adjusted to provide also for exposure balancing of other LED's. This is desirable where non-uniformity in illumination from LED to LED on the printer head may be expected. While the patent notes that a programmable clock may be employed to adjust the time period for each clock pulse, the clock periods will nevertheless be uniform after any such adjustment.

A problem with the above is that it does not efficiently cover as much exposure space as might be desirable for grey level recording and taking into account the use of exposure time to control uniformity between LED to LED. Assuming one employs six data bits to define each pixel, 63 levels of grey may be recorded (not including white, i.e., no activation.) However, these 63 levels must be recordable within a time period comprised of at most 126 uniform clock periods plus a minimum established time, $T_{MIN}$. Where the clock periods are of relatively short duration, the 63 levels of grey may not provide the desirable range of grey levels. On the other hand, where the clock periods are of relatively longer duration, adequate extremes of grey may be recorded but fine differences in grey level recording particularly desired at relatively lower grey values will be lost.

In commonly assigned U.S. application Ser. No. 290,002, filed Dec. 27, 1988 in the names of Pham et al, a non-impact printer is described which provides improved grey level recording. Briefly, this is accomplished by providing a non-linear clock for calculating exposure times. The clock provides relatively short duration pulses used to control exposure times in the "toe" area of the density curve (reflection density vs. exposure time) and relatively larger duration pulses to control exposure times in the "knee" area of this curve. While this approach works well, still further improvements in control of exposures at the toe area would be desirable. While improvements may be obtained using clocks having significantly higher frequencies, the increased costs of same makes recourse thereto undesirable.

It is therefore an object of the invention to a non-impact grey level printer and method for printing which provides for improved grey level recording.

SUMMARY OF THE INVENTION

The objects of the invention are realized by method and apparatus for recording grey level pixels comprising dividing the exposure for recording a pixel into a plurality of sub-line exposures for recording said pixel; and on the recording of said sub-lines employing a multibit data signal to control the exposure on said sub-line for a period related to said multibit data signal, the multibit data signal for one sub-line being different than that used for controlling exposure on at least one other sub-line used for recording said pixel.

The objects of the invention are further realized by a method and apparatus for recording images upon an image receptor, which comprises a recording head having a plural number N of point-like recording elements per inch extending so as to record along a line, the recording head emitting a line of dot recording emissions in response to data signals; providing control means including means for providing data signals to the recording head for exposing M sub-lines per inch on the image receptor with a resolution of N×M dots per square inch, N and M being numbers greater than one and M being greater than N; and wherein the control means further includes master clock means emitting pulses of first and second frequencies and means for controlling the duration of the emissions from the recording elements by controlling a recording element during one sub-line of recording in response to a plurality of pulses of the first frequency from the master clock means and controlling the same recording element during a next sub-line of recording in response to a plurality of pulses of the second frequency from the master clock means.

The invention is further realized by a method and apparatus for recording images upon an image receptor comprising a recording element for emitting radiation for recording on the image receptor, first means for driving the recording element to record a picture element; the picture element being formed by a series of emissions from the recording element imaged upon successive sub-lines of the image receptor; second means for controlling the duration during each sub-line of an emission from the recording element for recording said picture element, said second means including master clock means for generating clock pulses at first and second frequencies, counter means for counting clock pulses derived from the master clock means by counting signal pulses derived from clock pulses of the first frequency during recording of one sub-line of said picture element and by counting signal pulses derived from the clock pulses of the second frequency during recording of another sub-line of said picture element and generating a multibit count signal and comparator means for comparing a multibit data signal for each sub-line with the count signal to determine a duration for driving of the recording element.

The invention is still further realized by a recording apparatus and method comprising digital counting means having a plurality of output lines representing in digital form a time changing numerical count during a count mode; clock means coupled to the digital counting means for changing the count represented by the output lines; comparator means coupled to the output lines and comparing the time changing count with each of several different predetermined counts and generating respective waveform pulses, the durations of each of which are related to a respective predetermined count; the clock means providing first clock pulses at non-uniform intervals for changing the count at non-uniform intervals during the count mode; and characterized by providing a recording head having a plural number N of point-like recording elements per inch extending so as to record along a line, the recording head emitting a line of dot recording emissions in response to data signals; control means including means for providing data signals to the recording head for exposing M sub-lines per inch on the image receptor with a resolution of N×M dots per square inch, N and M being numbers greater than one and M being greater than N.

DESCRIPTION OF THE DRAWINGS

FIG. 11b is a magnified view of a portion of the graph of FIG. 11a;

FIG. 12a is a graph illustrating, in accordance with the method and apparatus of the invention, various possible exemplary grey level exposure periods for a sub-line in a 400 dpi×2400 dpi addressability embodiment using a non-linear clock;

FIG. 12b is a magnified view of a portion of the graph of FIG. 12a;

FIG. 13 is a chart illustrating the composition of exemplary exposure times for multiply-addressed lines of pixels in accordance with the invention;

FIG. 19 is a table illustrating some clock states or cycles representing possible exposure times for each of two sub-lines used in recording a pixel in a system using two master clocks;

FIG. 20a is a table illustrating some clock states or cycles representing possible exposure times for each of six sub-lines used in recording a pixel in a system using two master clocks;

FIGS. 22-24 illustrate a scheme for calculating exposure values for the various sub-lines for recording a pixel to provide an extended range of exposures.

DESCRIPTION OF THE PREFERRED EMBODIMENTS

Because apparatus of the type described herein are well known, the present description will be directed in particular to elements forming part of, or cooperating more directly with, the present invention.

Figure 1:
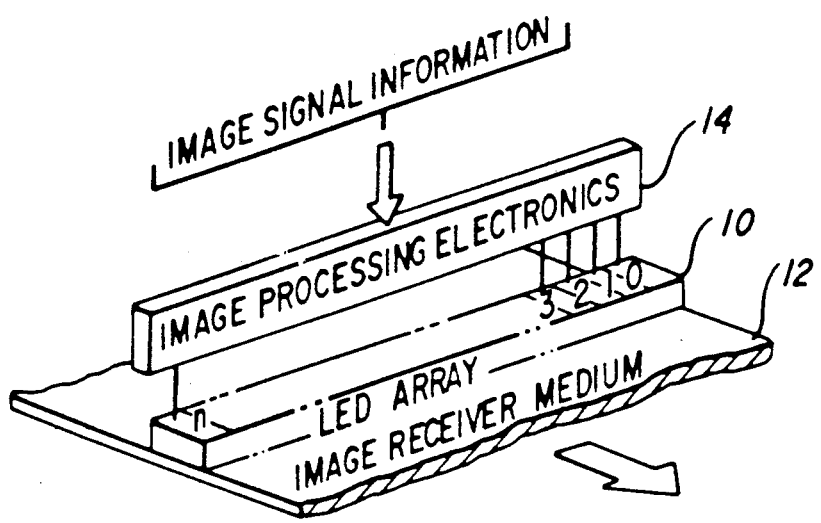
FIG. 1 is a perspective view illustrating the general arrangement of a non-impact printer as used in the embodiment of the invention and as known in the prior art.

The apparatus for the herein disclosed invention is typified by the diagram of FIG. 1: a linear array 10 of say 3584 triggerable radiation sources; e.g. LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using colored toner particles and perhaps transferred to a copy sheet, see U.S. Pat. No. 3,850,517, the contents of which are incorporated herein.

In order to facilitate understanding of the method and apparatus of the present invention, description will now be made of a prior art printer of U.S. application Ser. No. 290,002.

Figure 2:
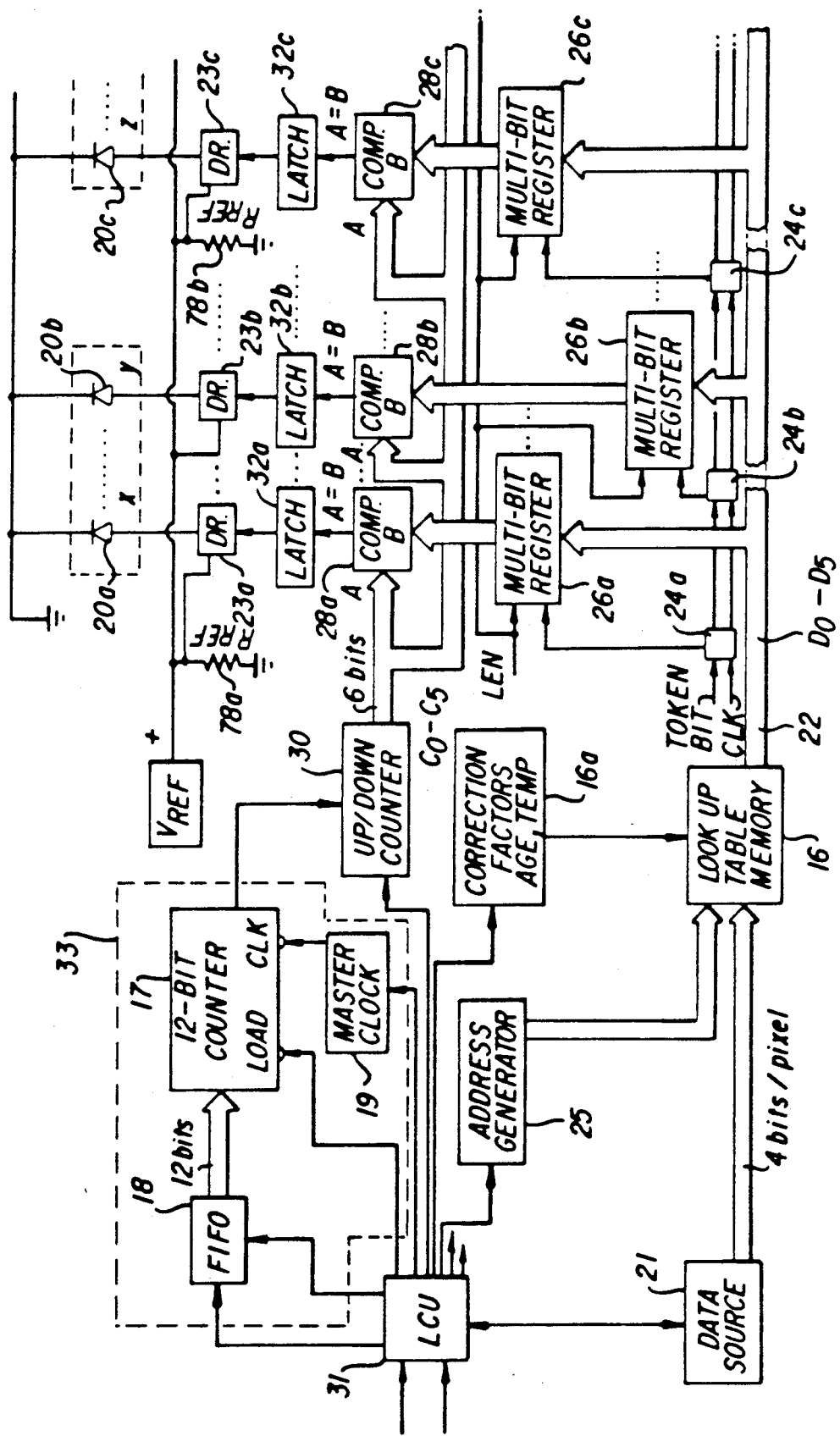
FIG. 2 is a schematic of a prior art printer circuit for recording grey scale information.

With reference now to FIG. 2, a prior art circuit is shown which may be used for triggering selectively the LED's 20 that together comprise the array 10. Only a few of the LED's and its associated driver circuitry are shown for clarity purposes, it being understood that the circuitry for driving such other LED's is similar to that described for the illustrated examples. While the figure shows all the driver circuitry associated with the LED's located to one side of the line of LED's, it is well known to place these circuits on both sides of the line of LED's to provide more efficient utilization of space.

Data to be printed for each line is in the form of binary digital signals, e.g., 1's and 0's. This data on lines labeled $D_0$–$D_5$ are outputted in parallel onto the data bus 22. The data on lines $D_0$–$D_5$ comprises, in this example, a six-bit signal representing an exposure time for a particular LED for printing a single grey level recorded dot. Synchronously with the generation of each six-bit data signal, there is generated by, for example, a logic and control unit (LCU) 31 a token bit signal which is a single bit that is shifted down a shift register formed by a plurality of individual registers 24a, 24b, 24c, etc. Each such register is associated with a particular LED. This token bit determines which of the LED's a particular set of data on bus 22 is intended. In operation, a series of six-bit data signals are provided on bus 22 and one six-bit signal is latched by each of the respective 3584 multibit registers 26a, 26b, 26c ... (etc.) associated with an LED. The latching being in response to the presence of the token bit in the particular register 24a or 25b or 25c, etc. Further description relative to a circuit for selectively latching this data is provided in U.S. Pat. No. 4,746,941, entitled "Dot Printer With Token Bit Selection of Data Latching," the contents of which are incorporated herein by this reference. After a six-bit data signal is stored in each of the multi-bit registers, a latch enable (LEN) signal is provided by the LCU 31 to shift this six-bit signal to an output stage or latch of each register so that a six-bit level data signal (say decimal 10 for LED 20a for this particular PEL period) is output to one input terminal (B) of a respective digital comparator 28a, 28b, 28c, etc. associated with each LED. At this point in time a digital counter 30 is enabled by LCU 31 to count down, in this example, from decimal 63 ($2^6-1$) to 0. The output of the counter 30 is a six-bit signal, in this example, ($C_0$–$C_5$) representing in digital form a number or count which changes periodically in accordance with clock pulses from a programmable clock 33. With each pulse (or trailing edge of same) from clock 33, the counter changes its count at its output. The output of counter 30 is input into each of the input terminals (A) of the digital comparator. Thus, the comparators now compare the signals at their respective A and B inputs in accordance with the comparators criteria for operation, i.e., is A equal B? When the count output by the counter 30 and inputted at terminal A is equal to a respective input data signal count input at terminal B (decimal 10, for example, but can be any number between 1 and 63) the output of a respective comparator goes to a digital logic high level and is latched at a respective latch register 32a, 32b, 32c, etc. The latched signals allow drivers 23a, 23b, 23c to be enabled, at the rising edge of the next clock pulse from programmable or variable clock 33, to commence and maintain current respectively to LEDs 20a, 20b, or 20c, etc. After the counter 30 counts down to zero, the counter 30 is either reset by the next clock pulse into a count-up mode or is inhibited from counting additional clock pulses for a minimum period $T_{MIN}$ that is programmed into the counter or provided by other suitable means. In the example shown in FIG. 3, the duration of $T_{MIN}$ is from a count of "1" in the down counting mode to a count of "1" in the up counting mode and the manner for controlling the time for reaching these counts will further be described below. In any event, after this predetermined time period $T_{MIN}$, the counter is set to count in its count-up mode and commences counting clock pulses again. When the counter output in its count-up mode reaches decimal 10, the output of comparator 28a changes and the latch 32a is reset and current to the LED 20a ceases. The other LED's 20b, 20c, etc. operate in similar fashion but their data will require different count values to turn on and off in accordance with grey scale data provided in their respective multibit registers. What these LED's will, thus, have in common with LED 20a is that all will have their respective current pulses centered. The current level to each LED is the same but the pulse duration for each LED during each line of print is varied. In this embodiment the LED's may be initially "balanced" such as by adjusting a "trim" resistor 78a, 78b, associated with each driver chip, see U.S. Pat. No. 4,831,395. Other known techniques for balancing output of the recording elements may also be provided, see for example, U.S. application Ser. No. 290,012, filed Dec. 27, 1988 in the names of Pin Tschang et al. In addition, further balancing or correction for unequal light output may be provided by adjustment of the data in accordance with the characteristics of each LED. Thus, a memory device such as a look-up table memory 16 or programmable read-only memory device or PROM may store the characteristics of each LED and data for that LED can be modified to provide an input count at terminal B that represents data modified by the exposure characteristics of the LED. For example, for an LED that is a relatively strong light emitter the PROM would modify data bits for that LED to reduce the count that otherwise would be provided at terminal B based solely on the data.

Further description relative to this additional type of balancing of recording elements will be provided below. The description now following with regard to density of recorded pixels refers to the recording using an addressability of 400 dpi×400 dpi as described in aforementioned U.S. application Ser. No. 290,002. It will be understood that in referring to addressability, the first number describes the number of recording elements or LED's per inch in the main scanning direction and the second number describes the number of recording pixels per inch for each recording element in the subscanning direction or direction of movement of the recording medium relative to the array of recording elements.

Figure 4:
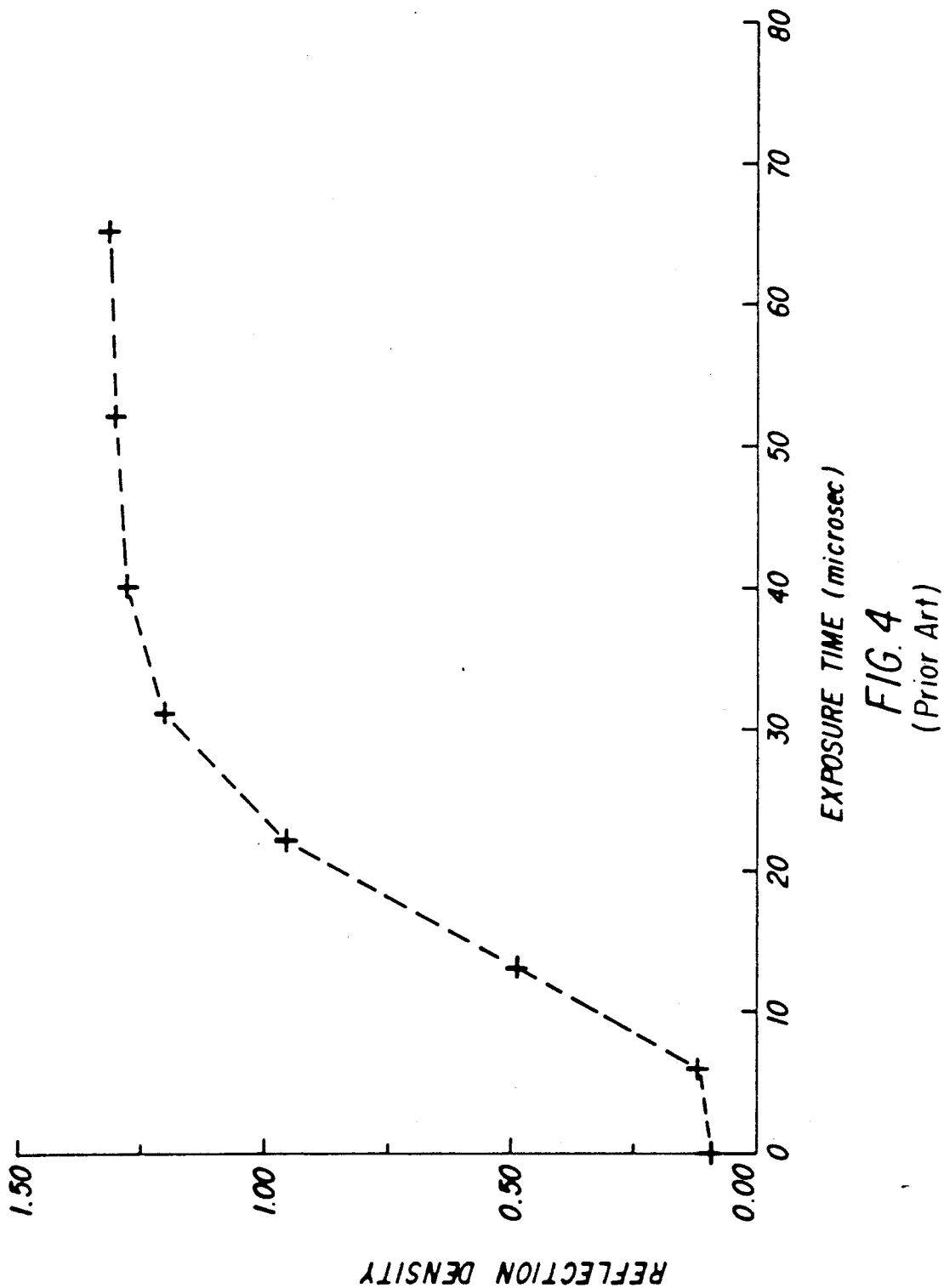

With reference to FIG. 4, there is illustrated a typical diagram illustrating recorded reflection density versus exposure time for a recording using a single average LED in the array and wherein addressability is limited to 400 dpi×400 dpi. The recorded reflection density will vary obviously in accordance with the exposure time of this LED. As may be noted the eventual reflection density approaches a maximum value and that further exposure durations produce some, but not great, changes in recorded reflection density.

Figure 5:
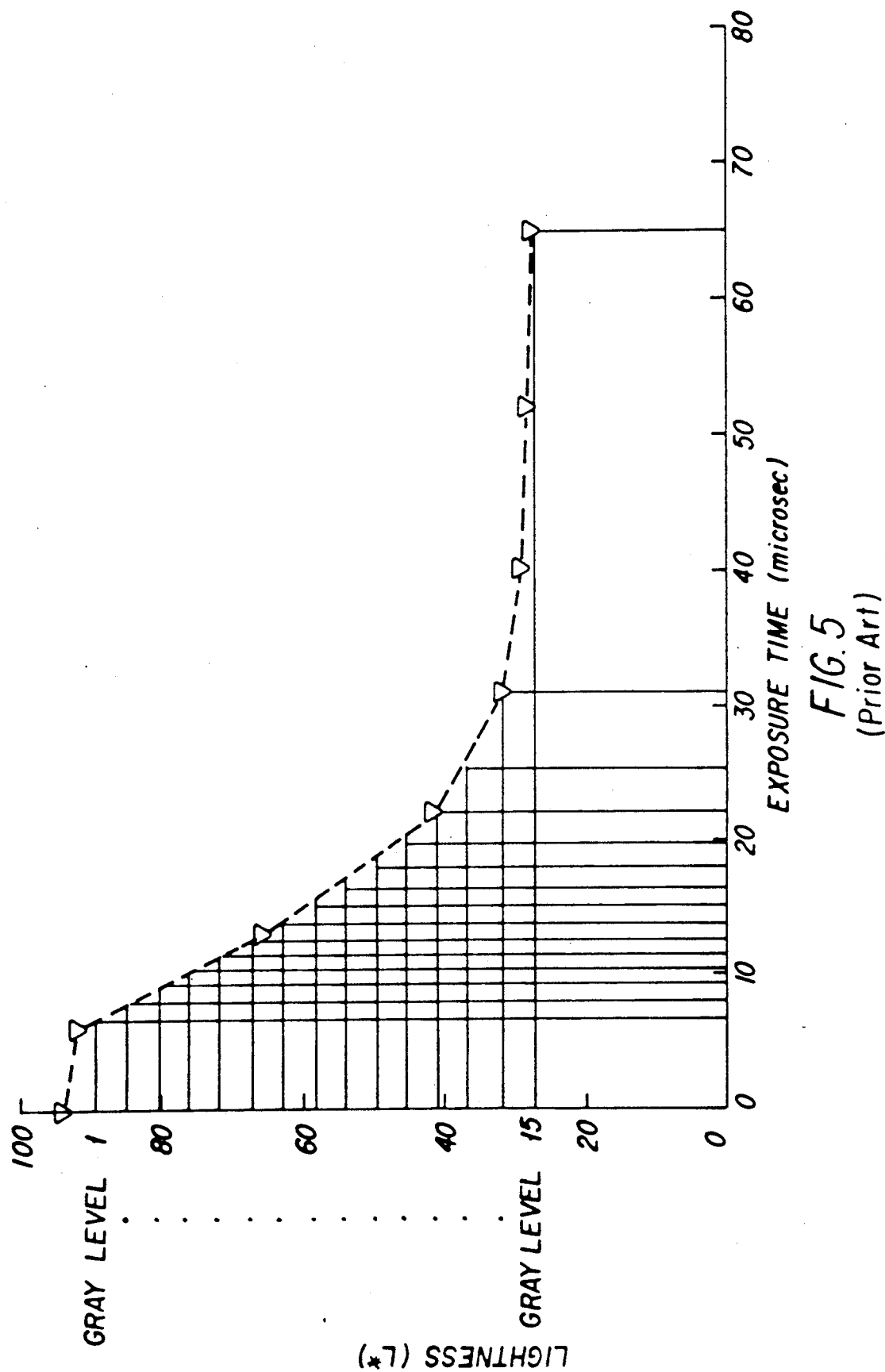

FIG. 5 illustrates the data of FIG. 4 transformed into lightness space. As known to those skilled in the art, such a transformation may be readily made by taking a value of reflection density (D) and forming the variable "lightness" (L*) therefrom in accordance with any of several known equations. Like transformations, including those for use in color printing and providing transformations into color space are also well known. Thus, lightness may now be plotted versus time and provides a relationship between various exposure times. It should be kept in mind that the light output of this LED is preferably balanced to at least some degree using adjustments to say $R_{REF}$, the driver resistance value as described above. Adjustments also to $V_{REF}$, the driver reference voltage may also be made. However, these provide a general adjustment of the 64 or 96 LED's driven by the driver chip, whereas more specific adjustment is needed from LED to LED. The advantage of employing the relationship between lightness and time is that, as is known, one can divide lightness space into equal increments and employ the corresponding exposure times to obtain a series of exposure areas with levels of grey that to the human eye appear to represent equal percentage changes in lightness. Thus, as shown in FIG. 5, lightness space is divided into 15 equally spaced grey levels (1-15) where obviously the higher the lightness value, the lower the grey value. The division into 15 levels is selected since, in an embodiment using 400 dpi×400 dpi addressability, output by the data source 21 provides 4 bits per pixel of rasterized data or grey level information or decimal 15 ($2^4-1$) levels of grey and one level being no or "0" exposure. Thus, the 15 levels are chosen by selecting the lowest and highest desired levels of lightness and dividing the space in between to provide 15 levels of lightness or grey values. For each grey value a corresponding exposure time is associated therewith for each LED.

Figure 6:
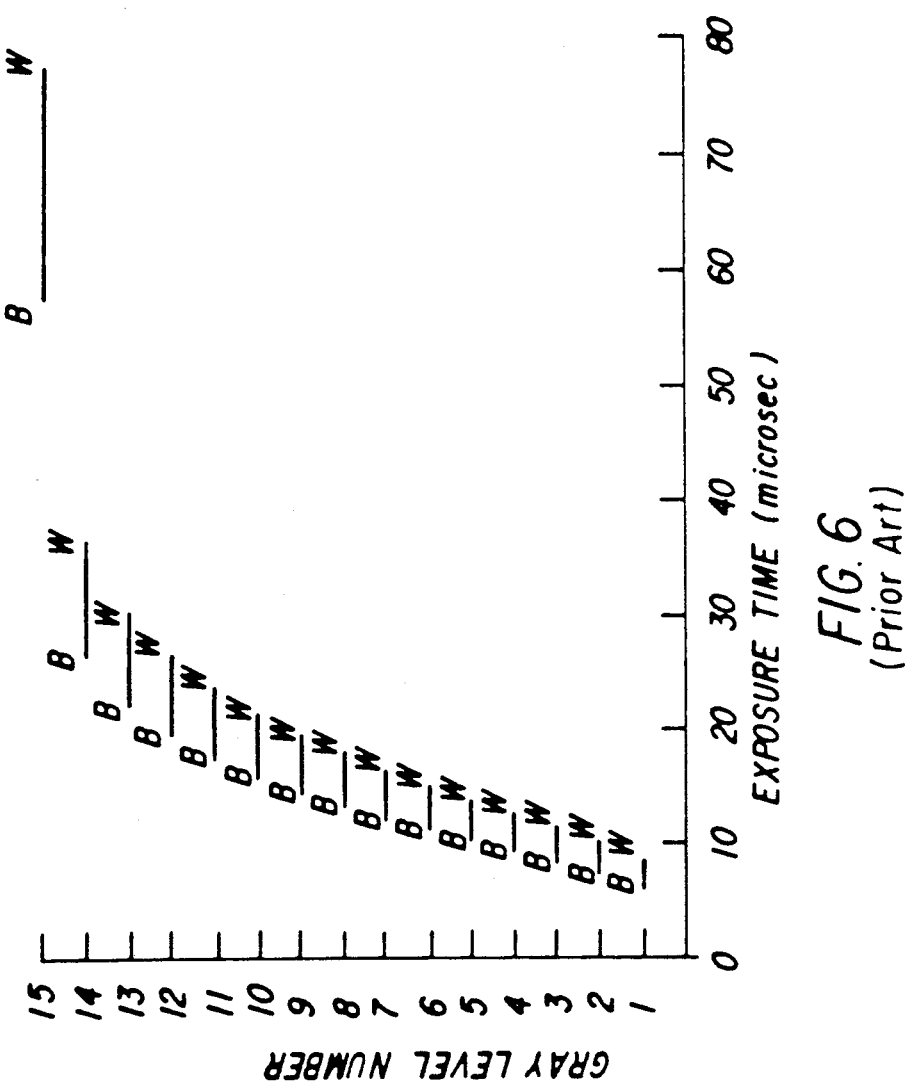

Description will now be had with reference to the graph in FIG. 6 which also described the case of 400 dpi×400 dpi addressability. In the description provided with regard to FIG. 5, it was noted that this was typical data for an average LED. Recall that the LEDs have been somewhat balanced by use of selective adjustment of $R_{REF}$ associated with say 64 LEDs driven by the respective driver chip. However, there will still be a small percentage of differences in light outputs between the LEDs; i.e., for the same signal some LEDs will provide more light and others less light because of their inherent differences or due to differences in their drivers or variations in LED fabrication process. FIG. 6 represents an illustration of this. Each horizontal hash-like line represents a range of exposure times that are needed for all the LEDs in the array to provide an exposure of the indicated grey level. Taking grey level No. 1, for example, the very brightest LED in the arrays will require the least amount of exposure time to record a density equivalent to grey level No. 1. This exposure will be for the period $T_{MIN}$ shown in FIG. 3. The minimum exposure time for each grey level is indicated by the letter B (for brightest LED's) which is located at the left most extreme of each line. On the other hand, the very weakest LED's in the array will require the longest exposure time (indicated by a W at the end of the line) to produce a dot having a density equal to grey level No. 1. Obviously, the remaining LED's in an array will require exposure "on" times between points B and W. The range of exposure times for each LED may then be determined for each grey level as shown.

It may also be noted in FIG. 6 that for any LED the exposure time difference for producing a dot of grey level No. 2 versus that for producing a dot to form grey level No. 1 is a very small difference in time. In this regard, compare the difference in exposure times for the brightest LED's (B) at grey level No. 1 and at grey level No. 2 with that difference in exposure times for the brightest LED's between grey levels Nos. 14 and 15. While the time between "B" of grey level 15 and "W" of grey level 14 is shown exaggerated to demonstrate the flexibility of the improved printing apparatus, it is generally true that the eye is more sensitive to changes at the lower levels of density than for changes at the upper levels of density. Similarly, if one desired to precisely balance the outputs of all the LED's on an array an algorithm for achieving this balance can preferably take advantage of this fact. However, for one designing a printhead using digital devices a constraint is provided as to how much correction information can be provided realizing that data has to be carried over lines formed on the printhead and only so many lines can be economically provided on a printhead. In addition, the more lines of data require more complexity in the logic devices for handling this data on the printhead.

With this in mind, reference will now be made to FIG. 7 wherein the exposure times associated with each grey level are shown divided up by vertical lines which will now be explained. Recognizing that a printhead has 3584 LEDs the range of exposure times for producing a dot of grey level No. 1 will fall on the horizontal line shown. If this line is divided into say seven distinct values, all exposures times on this horizontal line can be approximated by one of the times represented by the seven vertical lines crossing this horizontal time line. Similarly, this can be repeated for each grey level but note that higher grey levels need not have as many approximating points as the eye may not be able to detect finer approximations. Recognizing this will result in more efficient use of available data lines.

Figure 8:
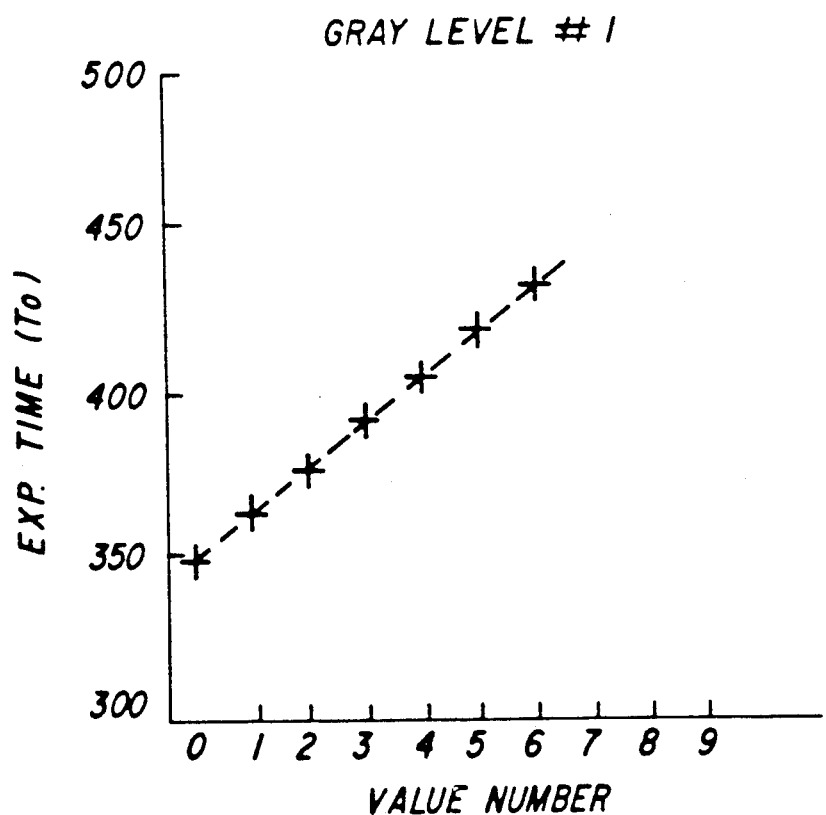
FIGS. 4-9 illustrate various graphs that may be used to determine the various allowed on-times for the recording elements in the prior art printer circuit of FIG. 2.

With reference now also to the graph of FIG. 8, the seven approximated exposure times for grey level No. 1 are assigned a value "0" through "6" and are plotted against exposure time in terms of number of master clock periods. Time in the printer apparatus of FIG. 2 is measured in terms of clock periods from a master clock 19. Master clock 19 is a clock providing regular pulses at a frequency of say 40 MHz. Thus, for producing grey level No. 1 the brightest LEDs will be "on" for say 350 pulses from master clock 19.

Figure 7:
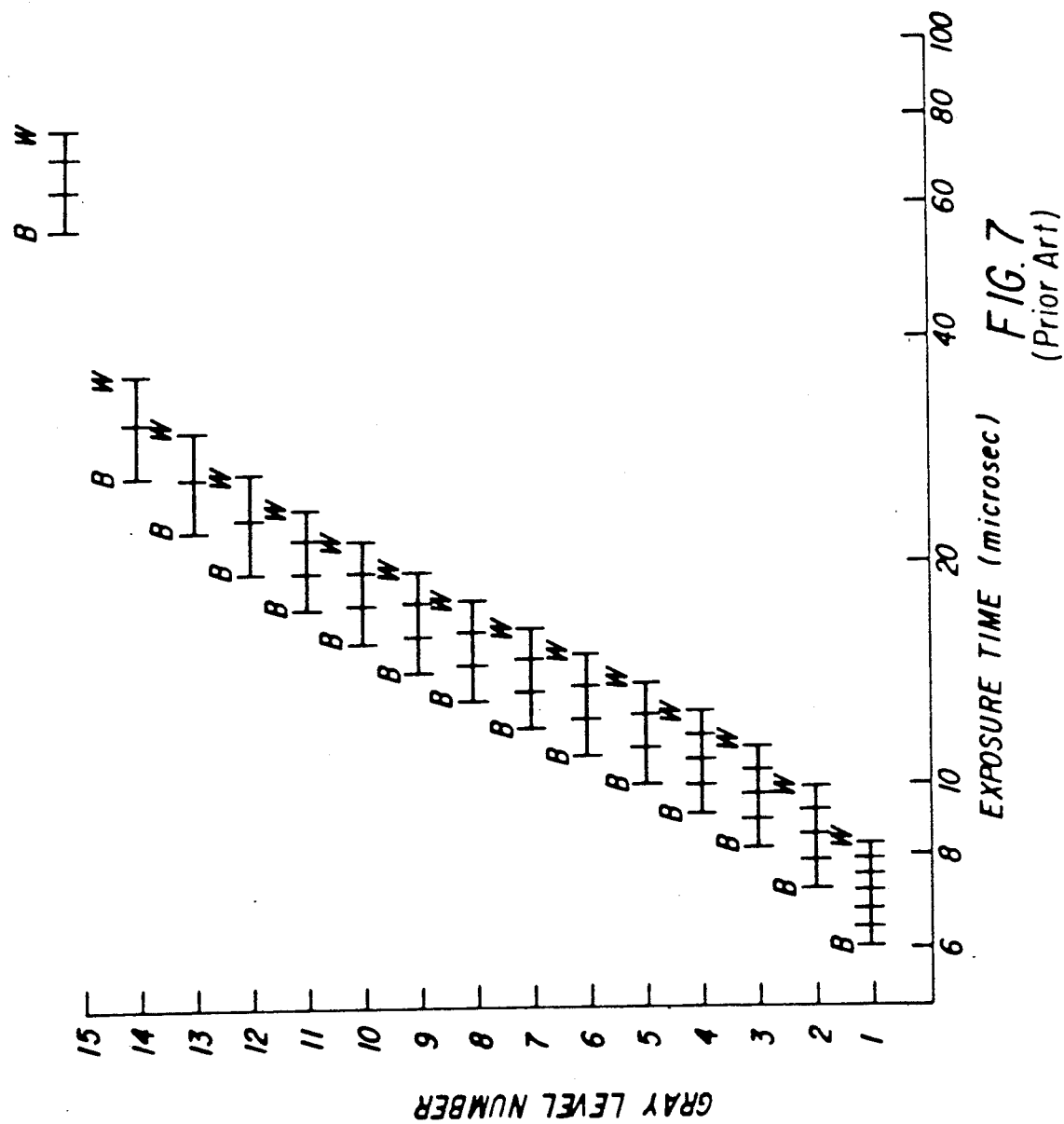
Figure 9:
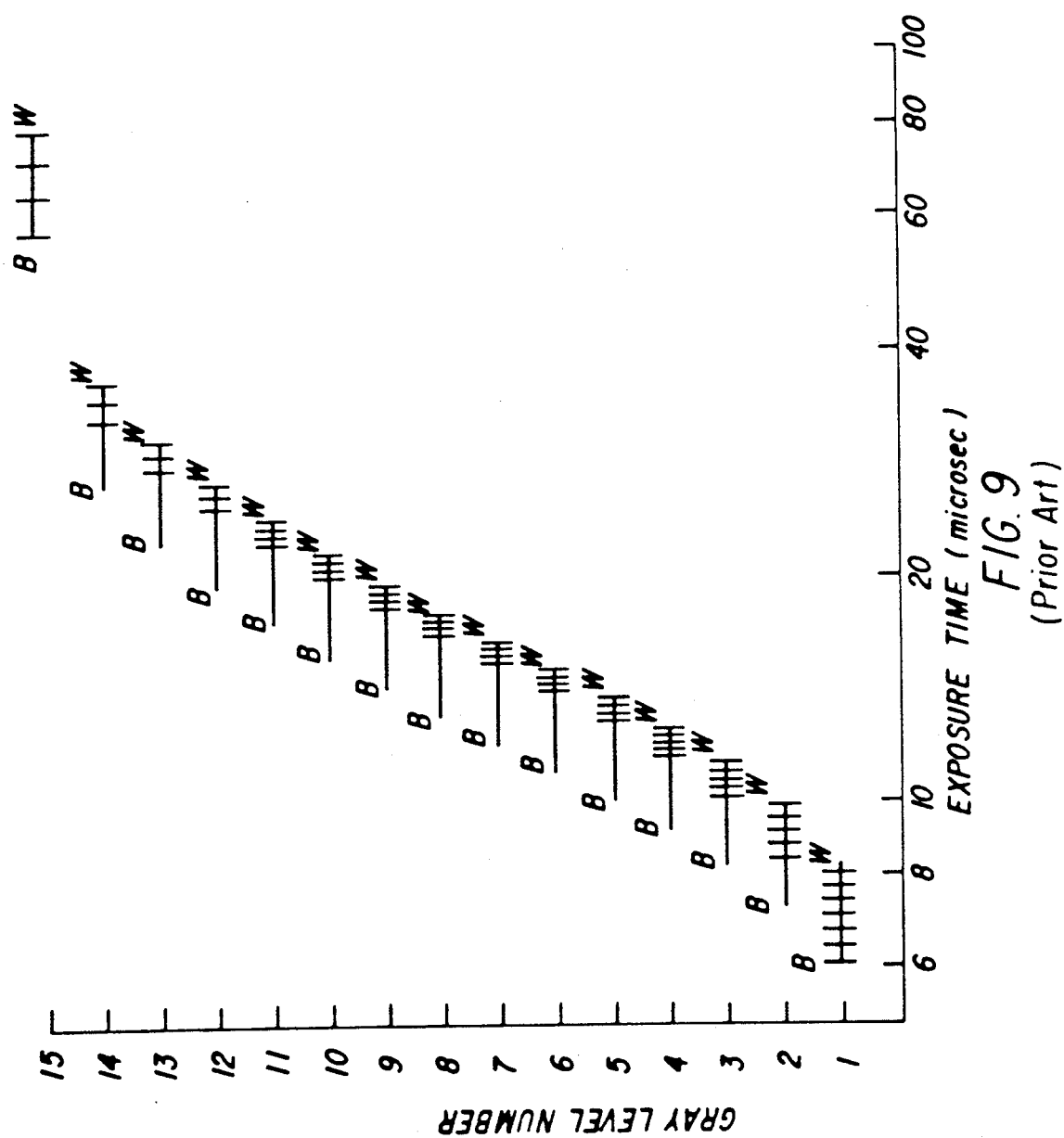

With reference now to the graph of FIG. 9, a modification from FIG. 7 has been made to eliminate overlap in exposure times between the various grey levels. In this example, the five approximating time values used for grey level No. 2, however, are confined to the time line portion of this line that will not provide overlap with other times in other grey levels. Thus, except for grey level No. 1, in this example closer approximations are made for exposure correction for the various grey levels as will be described below and more efficient use of data realized.

As may be noted from FIG. 9, for this example, the allowed exposure times number 63 which is $2^6-1$. This can be seen by counting the vertical exposure time lines shown, i.e., add the seven lines for grey level No. 1, the five lines for grey level No. 2, the five lines for grey level No. 3, etc. Thus, only 6 data lines are required to go to the printhead to provide possible exposure enabling times for the LED's that extends over a relatively long duration yet provides for fine approximations for correction in those areas of lightness space where it is needed.

Description will now be provided as to the method and apparatus described in aforementioned U.S. patent application Ser. No. 290,002 for generating the signals for creating these 63 exposure times which are nonlinearly related. In the graph shown in FIG. 9, exposure times are shown to vary, for the particular printhead illustrated, from 6 microseconds to about 80 microseconds. Recall also that the technique employed for creating a single pulse width exposure period is to provide a minimum on time $T_{MIN}$ for the shortest duration pulse used which can be considered the pulse for driving the very brightest LED for the minimum time necessary to record grey level No. 1. As noted in the graph of FIG. 8, an exposure in time units is equated with a value number which latter number may be used as the count from counter 30. For each grey value, there are calculated the corresponding value numbers (from 0 to 63) of the allowed exposure times shown in FIG. 9.

With reference now to FIG. 2, description will now be provided relative to the circuit 33 for generating clock pulses that change with a varying periodicity. A memory device such as a first-in, first-out (FIFO) memory 18 is loaded in this example with a 12-bit number that is provided, for example, by a serial signal from LCU 31. This 12-bit number is output in parallel from the FIFO 18 and input to a 12-bit counter 17 that includes a comparator means. At the beginning of a PEL period (picture element period) this counter is reset by a signal from LCU 31 and in response to a synchronizing signal from LCU 31 commences to count clock pulses from master clock 19. Upon reaching the 12-bit count provided at its input, the counter 17 emits a single pulse and resets itself to repeat this operation. Alternatively, the counter may be preset to the 12-bit count that is input thereto and count down to zero and emit a single pulse. As long as the 12-bit number at its input remains unchanged the counter 17 will emit a series of pulses equally spaced in time. The output of this counter 17 comprises the output of the elements defined as the variable clock 33. As may be noted in FIG. 3 in the time line labelled "variable clock" the output of this clock is shown to be groups of clock pulses wherein, for this example, in each group the respective pulses are uniformly spaced. Each of these groups can be thought of as representing exposure times for a particular grey level. However, recall also that as described with regard to FIG. 9 that there is overlap in exposure times between grey levels. As may be noted from FIG. 9, the exposure times for grey level No. 15 can be approximated by 4 exposures times indicated by the vertical lines. These 4 times are represented by the 4 uniformly spaced in-time clock pulses (rising edges of variable clock 33) in the group labeled (grey level) "#15 MAX - #15 MIN." The spacing between clock pulses is directly related to the 12-bit number or clock coefficient output from FIFO memory device 18. In this example, the FIFO memory has input therein, from LCU 31, 127 clock coefficients. As the clock pulses are to be created in groups of uniformly spaced pulses, some of the coefficients are the same so that after counting to the 12-bit number and emitting a single variable clock pulse the counter receives the next 12-bit number which may be the same as the previous 12-bit number.

Figure 3:
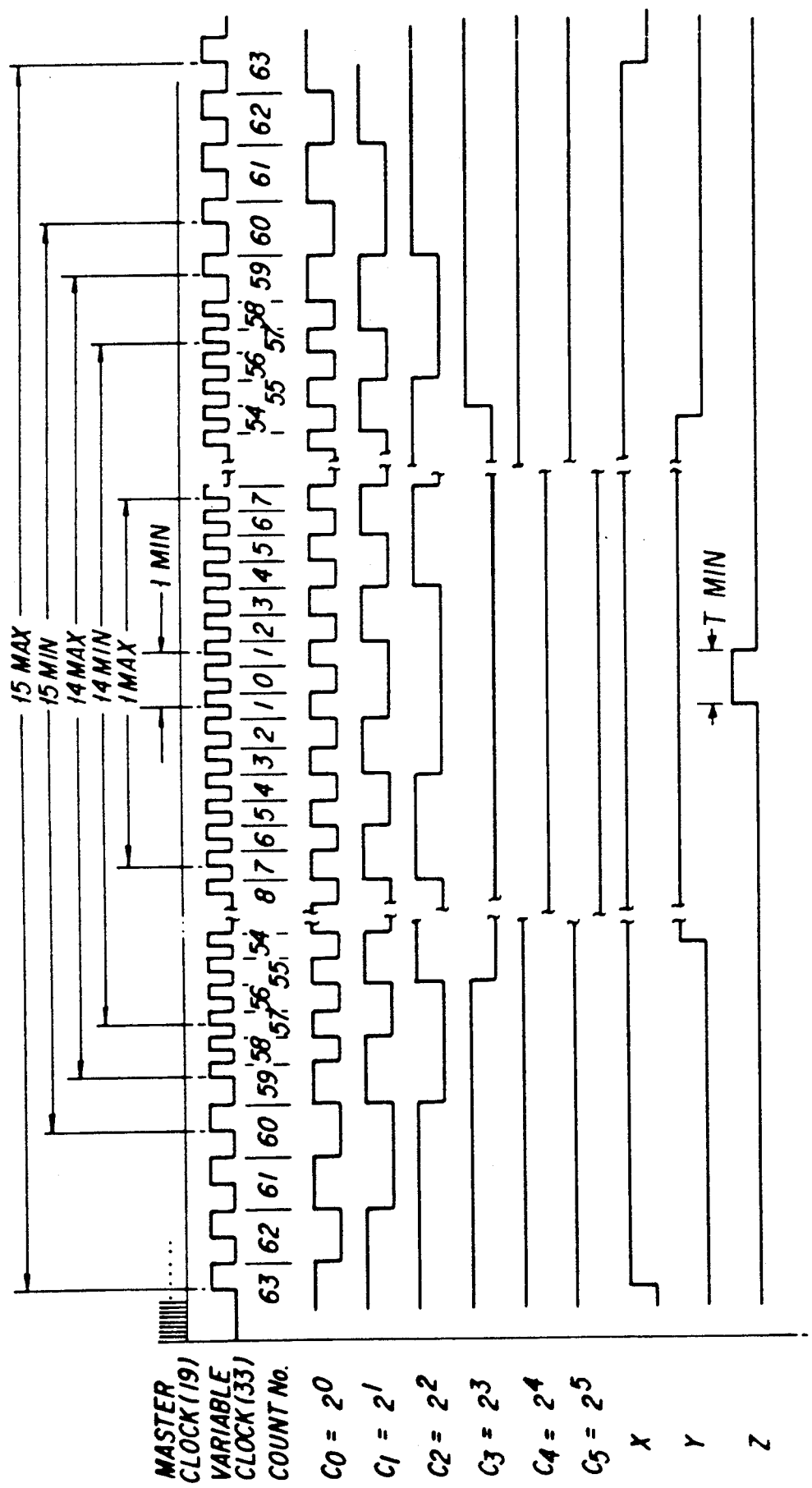
FIG. 3 is a timing diagram of sets of waveforms generated using the apparatus of FIG. 2.

After producing these 4 uniformly spaced clock pulses for grey level No. 15, the FIFO outputs a new 12-bit number. This causes 12-bit counter 17 to create a series of differently uniformly spaced pulses that are spaced a different amount in time related to the new 12-bit number output by the FIFO memory to the counter 17. The three pulses in this next group are labelled (grey level) "#14 MAX - #14 MIN" and relate to the three time divisions of grey level No. 14 shown in FIG. 9. The process continues in like manner to that described above with groups of uniformly spaced clock-like pulses created but having different periodicity from group to group. The up/down counter 30 counts these pulses and initially is in a down count mode. Thus, the output of the counter 30 has its six output lines $C_0-C_5$ provided with digital signals as shown in FIG. 3. The decimal representation of the combined count in all six lines $C_0-C_5$ is also indicated. As may be noted the count changes nonlinearly with time just in the same way for the time line illustrated in FIG. 9. Note in FIG. 3 that the longest duration pulse that can be provided is that shown as the pulse x used for the weakest (w) of the LEDs to energize each for a time period to record a grey level No. 15 dot. The shortest duration pulse $T_{MIN}$ or Z is provided to the brightest of the LEDs (B) when energized to each record a grey level No. 1 dot. All other exposure times for the LEDs will be like pulse Y for a duration that is between these two extremes. Note all exposure pulses to create a dot are of a single pulse and are center pulse width modulated to provide for a better looking print particularly when printing lines, etc.

In the discussion provided above, it was noted that the data source 21 provided data information having 4 bits per pixel while the data passed along to data bus $D_0-D_5$ was 6 bits per pixel. As may be noted in FIG. 2, the data sources output is input to a lookup table memory device 16 along with an address provided by an address generator 25. The address generator points to the location in memory device 16 thereof where data is stored for each particular LED. Thus, a table of memory is provided for each LED and indicates for this LED a corresponding exposure time for each grey level it is to print. It is this exposure time which is a six-bit digital number that is output as data onto data bus $D_0-D_5$.

While the six-bit per pixel signal ($D_0-D_5$) represents exposure information corrected for nonuniformities of the LED's, it is recognized that during use of the printhead nonuniformities arise due to different aging of the LED's or due to differences in temperature. Aging differences are created when some LED's are used more than others during the course of different print jobs. In U.S. Pat. No. 4,799,071, it is proposed to minimize aging differences by activating underused LED's during periods of non-use of the printer for printing a print job or otherwise correcting for non-uniformities based on differences in aging as the printhead is being used. Thus, factors such as those based on environmental considerations and/or usage may be accommodated by providing updated entries automatically from a correction calculator 16a to look-up table memory 16.

The prior art embodiment described above has been described in terms of generating a set of center pulse width modulated waveforms for enabling the LED's, wherein in the count-up mode of counter 30 the clock pulses from programmable clock 33 are provided in reverse order from that provided during the count-down mode of counter 30. This is accomplished by loading the FIFO memory (other types of memory devices such as RAM, etc. may be substituted for the FIFO type memory) with the same 12 bit numbers but with the order of providing such numbers reversed from that during count-down. The prior art notes that it is not limited to providing sets of center pulse width modulated waveforms for energizing the LED's. For example, all the LED's could become enabled at different times as described but stopped at the same time such as when the count reaches zero with no count-up mode being provided. Likewise, all the LED's may become enabled at the same time and terminated at different times during a count-up mode only. Still further, a count-down and count-up mode may be provided as described for the preferred embodiment but the clock pulses from the variable clock during count-up mode of counter 30 need not be provided to effectively mirror image those provided during the count-down mode of counter 30. Thus, instead of reversing during count-up of counter 30 the order of loaded 12-bit numbers from FIFO 18 to 12-bit counter 17, different numbers or ordering or the same order as used in count-down may be used during count-up that results in the waveforms not being center pulse-width modulated.

The prior art further notes that approximations within a grey level have been divided into equal portions. For example, grey level No. 15 is approximated by four exposure times represented by the four vertical lines indicating same. Thus when producing variable clock pulses representing grey level NO. 15 the clock pulses produced in that segment of time are equally spaced apart (see FIG. 3, variable clock line). This may be referred to as providing piece-wise linear clock pulsing. A perhaps better control providing more uniformity in printing, may be realized by dividing each grey level non-uniformly, thus providing a totally non-linear clock pulsing from programmable clock 33. In such case, a graph of the parameters exposure time versus value #, similar to that plotted in FIG. 8, would not be a straight line. The 127 clock coefficients or 12-bit numbers stored in FIFO 18 may thus be all different. Where center pulse width modulation is desired, the first 63 coefficients output from FIFO 18 may be all different while the last 63 output from the FIFO being an effective mirror-image or reversal in order of the first 63 to provide a truly non-linear clock pulsing from programmable clock 33.

Figure 10:
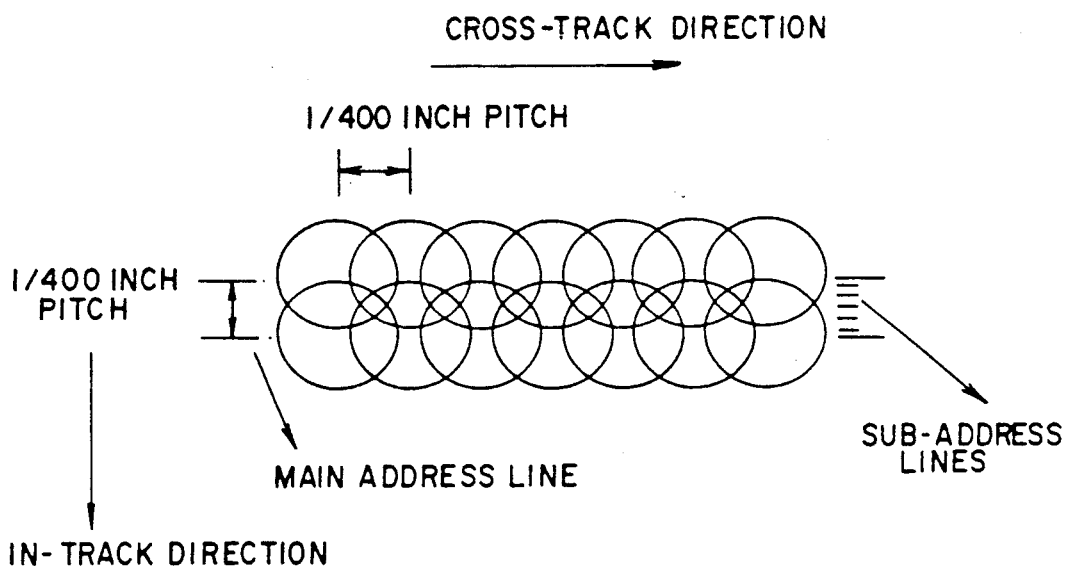
FIG. 10 is an illustration of pixel recording using 400 dpi×400 dpi addressability with hash lines illustrating sub-address lines for 400 dpi×2400 dpi addressability.

The concept of multiple addressability of printing will be described with reference to FIG. 10. In this regard, reference may also be made to my U.S. Pat. No. 4,835,551. When printing with an LED printhead having a linear array of say 400 LED's per inch, it is conventional to also record at the rate of 400 lines per inch in the in-track direction. As may be seen in FIG. 10, the recorded picture elements (pixels) are relatively large and some overlapping between adjacent lines of pixels (in-track) as well as adjacent pixels in the cross-track direction may occur. This provides a resolution of 400×400 pixels per square inch. If these pixels are binary pixels, i.e., recorded by a device that is either on for a fixed time or off, then this resolution is not sufficient to reproduce grey-scale images such as halftones or continuous tone images in those instances where "near photographic" quality is required. The concept of multiple addressability as described in my U.S. Pat. No. 4,835,551 provides for increased resolution in printing by printing additional lines of data so that in the example of a 400 dot per inch cross track printer, 2400 lines of pixels may be printed in the in-track direction. This provides a resolution of 400 dpi × 2400 dpi whose image quality may be enhanced even further by providing multi-level recording or grey level recording to the formation of each pixel. The additional lines of recording are illustrated by the short hash lines in FIG. 10 representing sub-address lines. Each sub-address line represents the printing of a new line of data that is sent to the printhead. Therefore, the amount of printable information is increased over a 400×400 grey level addressable points per square inch printer.

Figure 11A:
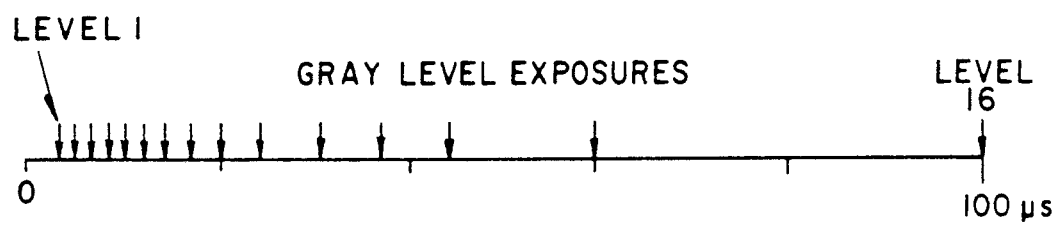
FIG. 11a is a graph illustrating various possible exemplary grey level exposure periods in a 400 dpi×400 dpi addressability embodiment using a non-linear clock.
Figure 11B:
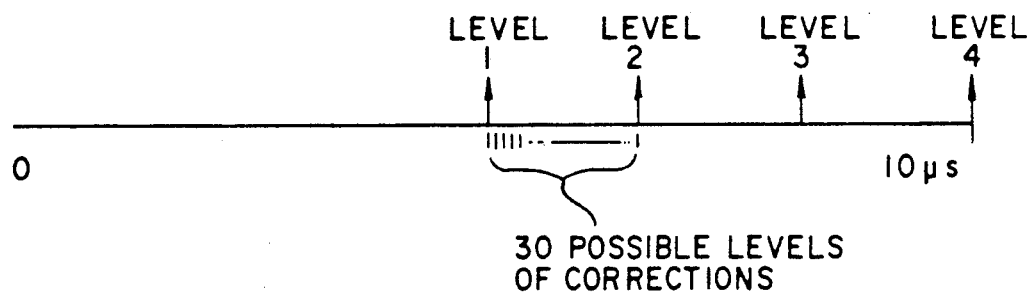
Figures 12A, 12B, 13:
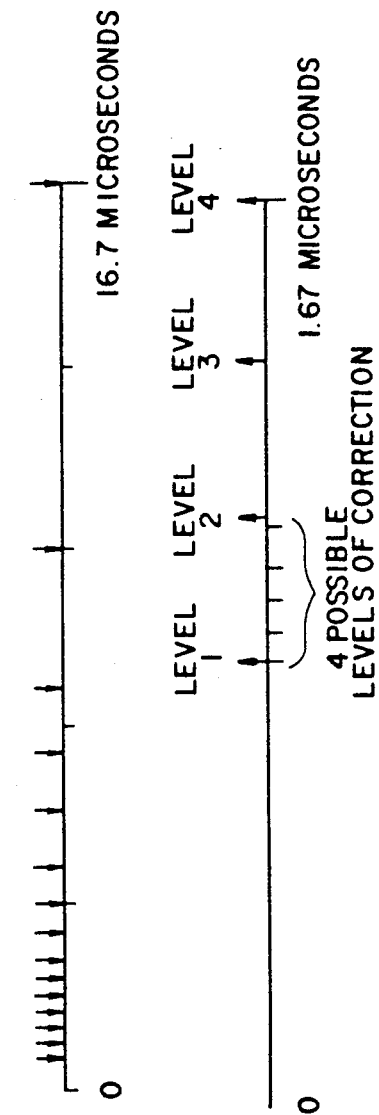

With reference to FIG. 11a, consider the prior art recording apparatus with 400 dpi × 400 dpi addressability and 16 levels per pixel. Assume, for example, that the possible 16 grey levels of exposure times for a particular LED may be 0, 5, 6.5, 8.25, 10, 12, 14, 16.25, 18, 20.5, 24, 31, 38, 45, 60, 100 μs., as shown in FIG. 11a. Assume also that the master clock 19 of FIG. 2 is a 40 MHz clock used to generate the non-linear exposure clock. In FIG. 11b there is shown a magnified view of exposure levels (1 to 4) for the example illustrated in FIG. 11a. The exposure times for grey levels 1 to 4 in the toe region of the density curve are respectively 5, 6.5, 8.25 and 10 μs. for this LED. Now recall that the on-time of an LED is defined by a six-bit signal $D_0$–$D_5$ which allows the sixteen grey levels of exposure to be selected from 64 or ($2^6$) possible exposure times. As the data signal from the data source 17 is a four-bit signal, the grey level of a particular pixel is thus defined by this four-bit signal. The duration, however, of printing of such pixel is defined by the six-bit signal which incorporates correction information with the grey level information for that pixel. Where a 40 MHz master clock 19 is used and center pulse width modulation is provided for, there can be a minimum separation of exposure durations of only two master clock pulse periods or 50 ns. (ns=nanoseconds). Where center pulsewidth modulation is not provided for such as where duration of an exposure period begins at one count and ends at another, it is recognized that the minimum separation of exposure duration can in this example be 25 ns. but the apparatus and method of the invention can still improve upon this. As noted in FIGS. 7 and 8, seven divisions or possible recording times are arbitrarily assigned to grey level #1. Note that for several thousand LED's on a printhead, it would be desirable to have many more divisions so that each LED accurately records its intended exposure and not just have some being accurate while others are not as accurate. Indeed, if the grey level #1 (assumed to be between 5 and 6.5 μs) is dividable into its 30 possible maximum divisions with use of the 40 MHz master clock approximately 1% accuracy in all LED's is achievable since no LED would have an actual exposure time that is off from its desired exposure time by more than one division or 50 ns. in an approximately 5μ (5000 ns.) exposure interval. Of course, one cannot assign so many levels (30) just to grey level #1 since a maximum of only 64 levels is possible with the six bits of data. However, in a multiple addressability printing scheme of say six sub-lines (400×2400 dots per square inch addressability) as a substitute for one main line (400×400 dots per square inch addressability) the overall exposure in each sub-line may drop or is compressed to no more than 16.7 microseconds as shown in FIG. 12a. Thus, the total exposure within the exposed area on the film plane may be the same between the two methods where the data for each sub-line is the same. However, different data and exposure times for the exposure levels can be provided for each sub-line and there is thereby created many more levels of grey level printing than the 16 levels of the single addressability line printing scheme of the prior art. In addition, even more uniformity correction levels are provided for mid-tones.

In order to improve printing in the toe region of the system, uniformity can be improved by using a very high frequency master clock, e.g., 240 MHz or above. However, this entails a substantial additional expense and a preferred clocking scheme using a vernier clock will be described below for improving upon uniformity correction. Reference will now be made to FIG. 12b to describe the problem of correction in the toe region for printing with a multiple addressable printing scheme. As may be seen, the four levels of exposure for each sub-line are compressed by a factor of six from that shown in FIG. 11b. Between grey levels 1 and 2 with a master exposure clock of 40 MHz, a minimum separation of 50 ns. is possible in a center pulse width modulation printing arrangement as described for FIG. 2. However, with new data provided for each sub-line of exposure, four levels of correction are possible in each sub-line, and 24 levels of correction are possible for all six sub-lines. But note that the best correction still can have some LED's off by about 50 ns. and thus still have uniformity correction be no better than 1%. This is not a problem in the mid-tone ranges (grey levels 7-12) in view of the relatively longer exposures in these ranges compared with a timing separation of 50 ns.

The vernier clocking scheme for clocking exposures in the method and apparatus of my invention will now be described with reference to FIG. 14. Many of the components of the circuit of FIG. 14 are similar to that illustrated and described with reference to the circuit of FIG. 2 and therefore description will be made of the differences between these circuits.

Figure 14:
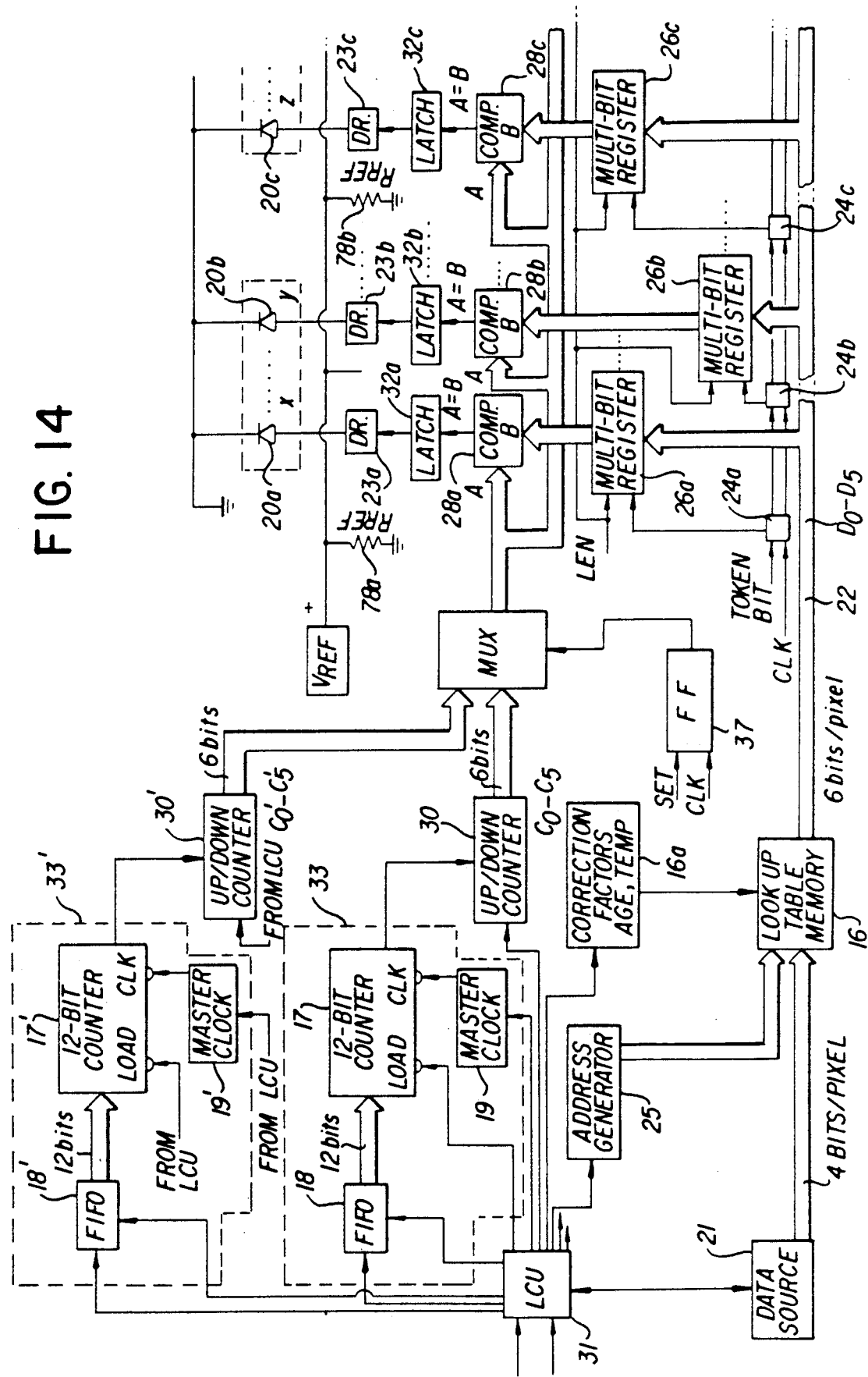
FIGS. 14 and 15 are alternative circuits in accordance with the invention for generating non-linearly clocked exposure durations in a multiply addressed recording apparatus.

As can be seen in FIG. 14, the circuit includes an additional programmable counter 33' which operates identically as that described for counter 33 but for the important exception that master clock 19' provides a master clock frequency of 38.46 MHz. Note that master clock 19 of FIG. 14 remains a 40 MHz clock as previously described. Thus, master clock 19 generates clock pulses at 25 ns. intervals while master clock 19' generates clock pulses at 26 ns. intervals. Effective exposure intervals will be discussed in terms of 50 ns. and 52 ns. intervals since using the center pulse width modulation technique effectively doubles the basic incremental clock pulse times of the master clock. As programmable clock 33' operates similarly to that of clock 33 programmed clock pulses are generated thereby and fed to up/down counter 30'. Thus, an additional six-bit count set ($C_0'-C_5'$) is provided based on the clock pulses from master clock 19'. Either count pulse sets $C_0-C_5$ and $C_0'-C_5'$ is selectable by a multiplexer 36 under control of a flip-flop 37. In response to a clock pulse from the LCU provided for each new sub-address line, the flip-flop changes its output and causes a different clock set to be input to terminals A of comparators 28. Thus, in printing sub-address lines 1, 3 and 5 count pulse set $C_0-C_5$ is input to terminals A and for printing sub-address lines 2, 4 and 6, count pulse set $C_0'-C_5'$ is input to terminals A of comparators 28. Note that at each terminal B of comparators 28 the data may change for each sub-address line. Thus, a row of sub-pixels is generated at each sub-address line in the same manner as described above for FIG. 2 where a row of pixels are generated for each main address line except that different clocks are available in this case for every other sub-address line. Also note that the 400 dpi×400 dpi data from data source 21 has been converted to 400 dpi×2400 dpi 6-bits per sub-pixel data at the look-up table memory 16. Thus, each original data pixel is to be printed over six sub-lines during recording. The address generator under control by the LCU keeps track also of which LED the data is being sent to as well as which sub-line is being recorded.

Further understanding and appreciation of the benefits of the vernier clocking scheme will become apparent with discussion of specific hypothetical examples which will be made with reference to FIG. 13. The circuitry of FIG. 14 employs a vernier clocking technique using different master clocks for the sub-line exposures. While the circuitry of the embodiment of FIG. 14 is illustrative of a programmable clock 33, 33', the following description will simplify matters for purposes of understanding the invention by assuming that each clock pulse from master clocks 19, 19' provides a new count to counters 30, 30' respectively. That is, the counts $C_0-C_5$ and $C_0'-C_5'$ are changed at the same frequency as master clocks 19, 19', respectively, during counting with the exception that there is control for when to commence and terminate counting and for allowing a minimum exposure time between counting down and counting up. An exposure duration for a particular LED of say 5658 ns. may be produced by having energization of the LED during each of sub-lines 1, 3 and 5 be 950 ns. using the 40 MHZ master clock and for each of sub-lines 2, 4 and 6 be 936 ns. using the 38.46 MHz master clock. Note that the use of alternate lines for changing the master clock is exemplary and that the 40 MHz clock can be used for sub-lines 1, 2, 3 and the 38.46 MHz clock used for sub-lines 4, 5 and 6. If a change in recording exposure time of only 2 ns. is desired, this is achieved by recording two sub-lines for 950 ns. using the 40 MHz master clock, recording another two sub-lines for 936 using the 38.46 MHz clock, recording a fifth sub-line for 1000 ns. using the 40 MHz clock and recording a sixth sub-line for 884 ns. This provides a total exposure for the six sub-lines of 5656 ns. or 2 ns. less than the first total exposure period. In order to provide an exposure that is 2 ns. more than the first example, i.e., 5660 ns. an exposure of an LED is made for 2 sub-line periods, each for 950 ns. using the 40 MHz clock, an additional 2 sub-lines using the 38.46 MHz clock for 936 ns. for each of these sub-line exposures and a fifth sub-line for 900 ns. using the 40 MHz clock and a sixth sub-line for 988 ns. using the 38.46 MHz clock.

While the master clocks 19, 19' have been described as producing clock pulses at regular intervals which are counted by the 12-bit counter, it is contemplated that this master clock will also be programmable so that while still emitting regular clock pulses, the time period between such regular clock pulses may be adjusted. Such adjustability may be provided by coupling the master clocks 19, 19' to the LCU so that either inputs by an operator or through automatic operation, signals from the LCU to the master clocks 19, 19' can adjust the periods between master clock pulses, as may be needed for color printing or other process control such as contrast.

Thus, in color printing, for example, using well known electrophotographic reproduction apparatus, for example, see U.S. Pat. No. 4,821,066, the contents of which are incorporated herein by this reference, successive separate image frames on a photoconductor are exposed with color separation images to be developed, respectively, with cyan, magenta and yellow toners. The developed image frames are then transferred in register to a copy sheet. In modulating the electrostatic charge on each image frame with the printing apparatus described herein to form the color separation images the variability of master clocks 19, 19' can prove useful. The clock pulse period from adjustable master clocks 19, 19' may be adjusted automatically for creating exposures on one color image frame, say cyan, to the next color image frame, say that for producing the magenta image. Adjustability of master clocks 19, 19' in combination with the variable programmable clock signals from programmable clocks 33, 33' provides for a very efficient and flexible control of exposure. In the example provided above for color reproduction, it is contemplated that the duration of each master clock pulse period used for printing one color separation image frame will differ by a few percent from that used in printing a different color separation image frame to provide the fine control for exposure time.

Figure 15:
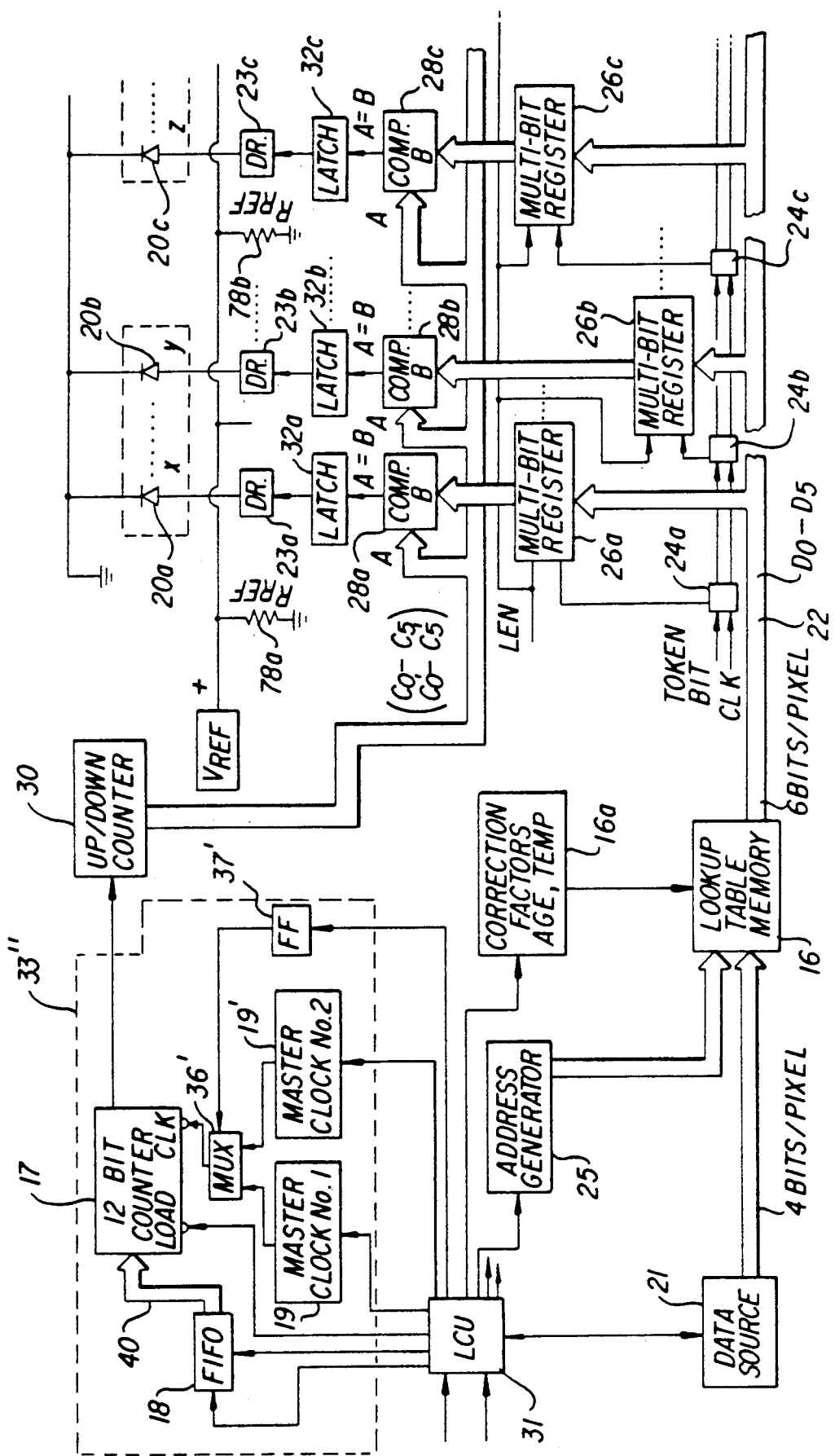

An alternative embodiment to the circuit of FIG. 14 is illustrated in FIG. 15 where like numbers represent similar circuit elements to that described for FIG. 14. In the embodiment of FIG. 15, master clocks #1 and #2 have their respective outputs input to a multiplexer 36'. A signal from flip-flop 37' switches the multiplexer prior to recording of each sub-address line. Thus, during the recording of the odd sub-address lines 1, 3 and 5 the output of master clock #1 (40 MHz clock) is input to the 12-bit counter 17 and the count output by up/down counter 30 represents the count $C_0-C_5$. Thus, the output of up/down counter 30 is changed by programmable clock 33'' not only in accordance with numbers fed by FIFO 18 to the 12-bit counter 17 but also by which master clock is selected for the particular sub-address line. In the circuits of FIGS. 14 and 15, the full capacity of a 12-bit counter may not be needed and it may be replaced by a counter of lower bit handling capacity. While different master clocks are specifically illustrated herein, they may also comprise a voltage controlled oscillator whose frequency varies with applied voltage.

Figure 16:
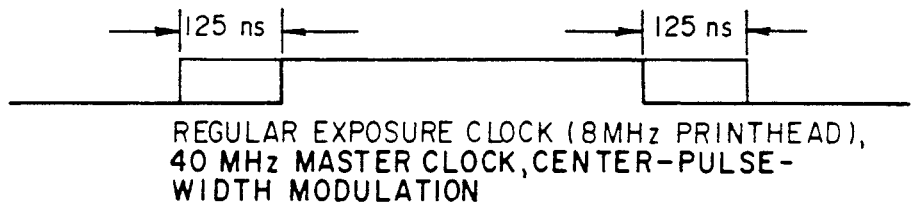
FIG. 16 is a sketch of exposure pulses illustrating a problem that is overcome by the apparatus and method of the invention.
Figure 17:
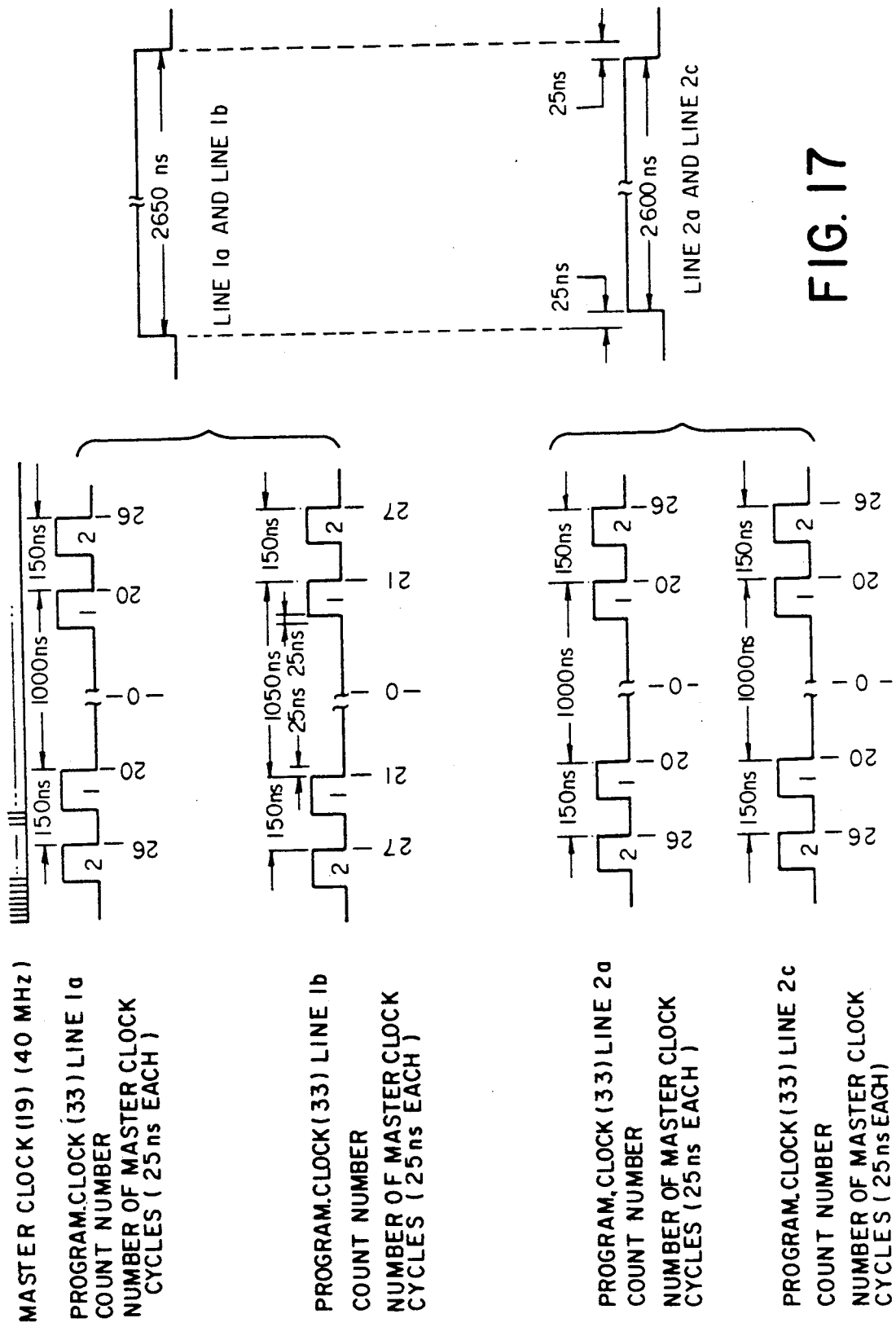
FIG. 17 is a sketch of clock pulses and exposure pulses illustrating how the problem of FIG. 16 is overcome in another embodiment of the apparatus and method of the invention which uses a single master clock.

In the above description of an exposure clock providing 40 MHz exposure clock pulses, assumption is made that the circuitry such as counters 30 and 30' are all operative to be responsive to pulses having a 40 MHz frequency. Description will now be provided of an alternative embodiment wherein the speed of these devices are only 8 MHz, but the master clocks 19, 19' are 40 MHz and 38.46 MHz, repsectively. In this alternative embodiment if one master clock and counter 30 were to be used, the clock pulses to counter 30 must be separated by at least 125 nanoseconds (ns) in accordance with the speed requirements of counter 30. Thus, with a scheme using center pulsewidth modulation and no multiple addressability the minimum difference in duration of exposure times of sub-pixels is as indicated in FIG. 16, 250 ns or uniformly correction in the high lightness region is limited to 250/5000 or 5% peak to peak. When the multiple address grey level approach as described herein is employed, the minimum difference in exposure duration between exposure times of pixels may be reduced substantially. With reference now to FIG. 17, assume a multiple address exposure system is employed using say four or more possible sub-address lines. In order to produce an exposure of say 2650 ns, the exposure may be broken up into two sub-lines of 1300 ns and 1350 ns duration as indicated for sub-lines 1a and 1b. It is also possible to provide an exposure using sub-lines 2a and 2c to provide a combined exposure of 2600 ns duration. Note that for each sub-line 150 ns is provided between clock pulses to meet the requirements of counter 30 that clock pulses be spaced at least 125 ns apart. Note also that sub-lines 1a, 2a and 2c are identical in this example but that sub-line 1b has its clock pules offset 25 ns in both the count-down and count-up modes of the counter. This is accomplished by assigning different counting states to the programmable clock 33 effectively commencing the count 25 ns sooner on the down-count and 25 ns later on the up-count. Since the count from counter 30 goes to all LED driver circuits during recording of a sub-line, sub-line 2b is not used in this illustrative example but sub-line 2c is used because its exposure uses the same available counting states as was used in sub-line 2a. The available counting states in the odd sub-lines (1a, 2a, 2c) are 20, 26, 32, 38, etc. These numbers represent the number of master clock pulses (25 ns each for the 40 MHz clock) from the center line of the exposure for that sub-line indicated by the "-0-". It should be understood that the exposures of 2600 ns and 2650 ns are used illustratively. The above demonstrates the principle that with multiple addressability and with judicious selection of different counting states for the programmable clock that sub-pixels may be exposed with minimum differences representing two master clock (19) pulses (25 ns × 2 = 50 ns, in this example) in a scheme using an up-down counter such as for center pulseswidth modulation. It is possible to time exposures using an up only or a down only counter 30 in lieu of up-down counter 30 to provide differences in exposure between two sub-pixels of one master clock pulse. Assuming an actual minimum exposure of 5000 ns, it can be seen that using a single master clock with multiple addressability, it is possible to produce uniformity correction in the high lightness region to 50/5000 or 1% peak to peak for a center pulsewidth modulated pulsing scheme even though there are speed constraints in a counter such as counter 30.

Figure 18:
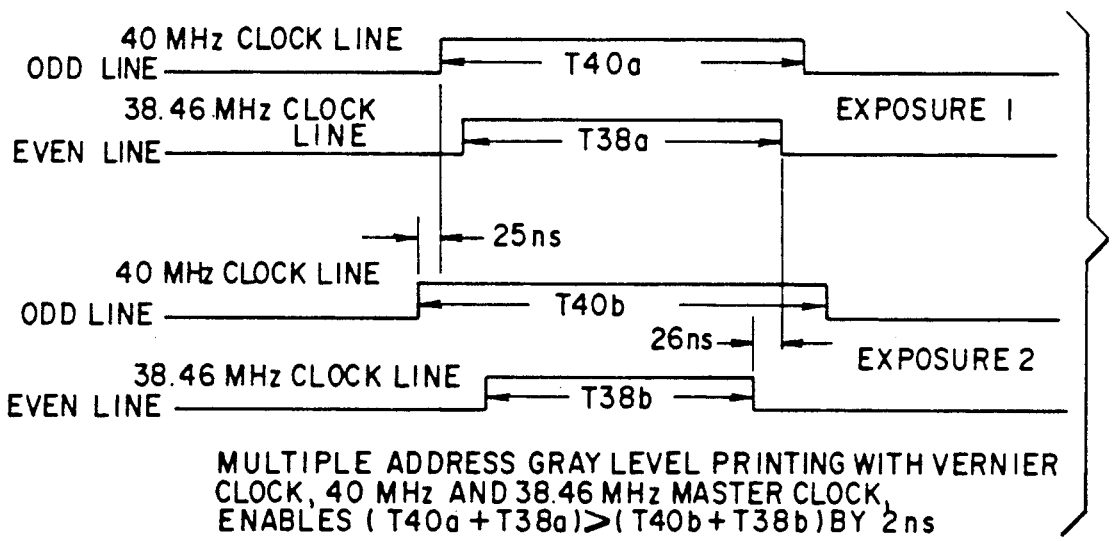
FIG. 18 is a sketch of exposure pulses illustrating sub-lines of exposure in accordance with another embodiment of the invention using plural master clocks.

With reference now to FIG. 18, a vernier clocking approach using two master clocks (40 MHz and 38.46 MHz) is combined with the scheme described above of using different counting states in the multiple addressable lines. In FIG. 18, pixel exposure 1 is a combination of sub-lines having exposure durations T 40a using the 40 MHz clock (25 ns clock pulses) and T 38a using the 38.46 MHz clock (26 ns clock pulses). Pixel exposure 2 may be seen to be a combination of exposure durations T 40b using the 40 MHz clock and T 38b using the 38.46 MHz clock. Exposure 1 (T 40a + T 38a) can be seen to be greater than exposure 2 (T 40b + T 38b) by 2 ns. By suitable selection of different sets of counting states when exposing exposures 1 and 2, it is possible to obtain a difference in exposure of two master clock pulses (50 ns) between the sub-lines used for exposing T 40a and T 40b. In this example, T 40b is 50 ns greater than T 40a. Similarly using the 38.46 MHz clock during different sub-lines of exposure, it is possible to have exposure T 38a be two master clock pulses (52 ns) greater than T 38b.

Combining the respective exposure times for respective sets of sub-lines provides a 2 ns exposure difference between exposures 1 and 2. Thus, by this type of combination of exposure time of the two slightly different frequency master clocks in two separate sub-lines in a multiple address printing system, one can get very fine quantization steps such as 2 ns which gives a potential uniformity of 2/5000 or 0.04% peak to peak in the highlight region of the tone reproduction curve.

However, in order to achieve this type of fine quantization with the dynamic range (say from 5 micro-seconds to 100 micro-seconds) that is desired for printing, one may require twelve sub-lines instead of six. There will now be described an implementation of a method that will cover a dynamic exposure range of 5,050 ns to 76,800 ns at 4 ns quantization steps with a 6-bits/pixel LED printhead and six sub-lines in the multiple address scheme for recording a 1/400 × 1/400 inch square pixel.

Figure 20B:
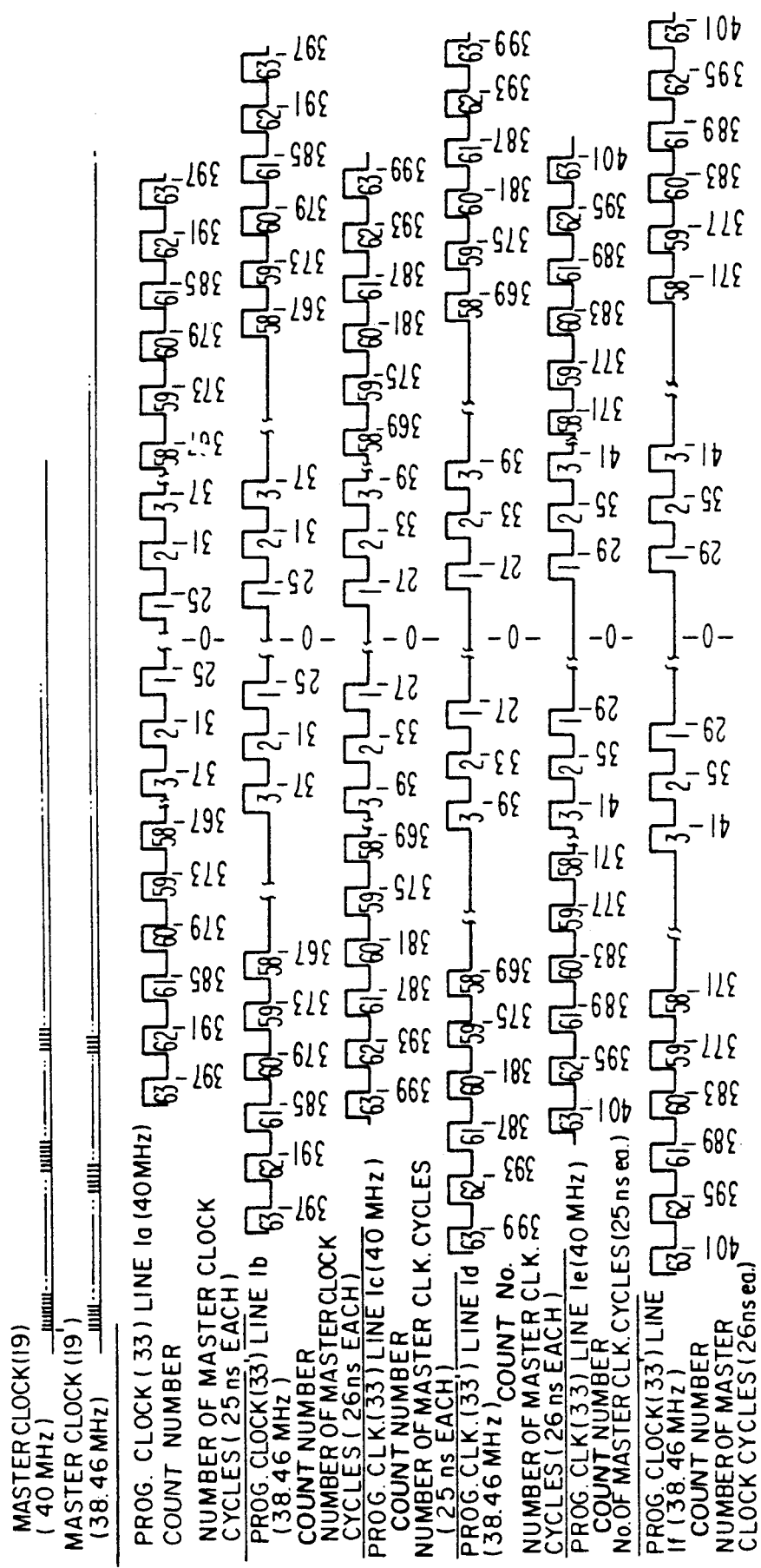
FIG. 20b is a sketch of clock pulses and count numbers for formation of a pixel element using six sub-lines of exposure and plural master clocks.

In the table of FIG. 19, we have shown in a center pulsewidth modulation scheme, the possible exposure clock states or cycles for the 40 MHz and the 38.46 MHz master clock lines from clock cycles 50 to 200 as well as the exposure time that it represents. To understand these states or cycles with that illustrated in FIG. 17, it should be understood the figures in the table for clock cycles are double that which would be used in a clock pulsing illustration of the type illustrated in FIG. 17. If the printhead system is fast enough or one has enough sub-lines (like 12) one can use all these states. However, with a printhead system that needs an exposure difference of 250 ns between exposure states on one exposure line (as shown in FIG. 16) and we have only 6 sub-lines, a possible implementation is shown in the table of FIG. 20a. Here in one of the sub-lines of say the 40 MHz line, we shall have states 50, 62, 74, 86, etc. on line 1; states 54, 66, 78, 90, etc. on line 2; states 58, 70, 82, 94 on line 3. Therefore within any sub-line, the timing difference will be 300 ns for a 40 MHz sub-line (or 312 ns for a 38.46 MHz sub-line). But between sub-lines, the timing difference will be 100 ns for the 40 MHz sub-lines (or 104 ns for the 38.46 MHz sub-line). Therefore, we can satisfy the speed restriction for the printhead speed as well as the lower frequency restriction of the master clock. The quantization is now limited to 4 ns between states, in this case when the vernier clock scheme is used. I will now show with this concept how one can have a wide exposure dynamic range as well. In FIG. 20b, there is shown the various states associated with pulses from the programmable clocks 33 and 33'. As noted above, number of cycles are one-half in magnitude from that of the table (FIG. 20a) due to the symmetry about the center line of the pulse. For example, the number of master clock cycles in line 1a shows available states of 25, 31, 37 etc. This corresponds to 50, 62, 74 of line 1 clock cycles in the table of FIG. 20a.

Figure 21:
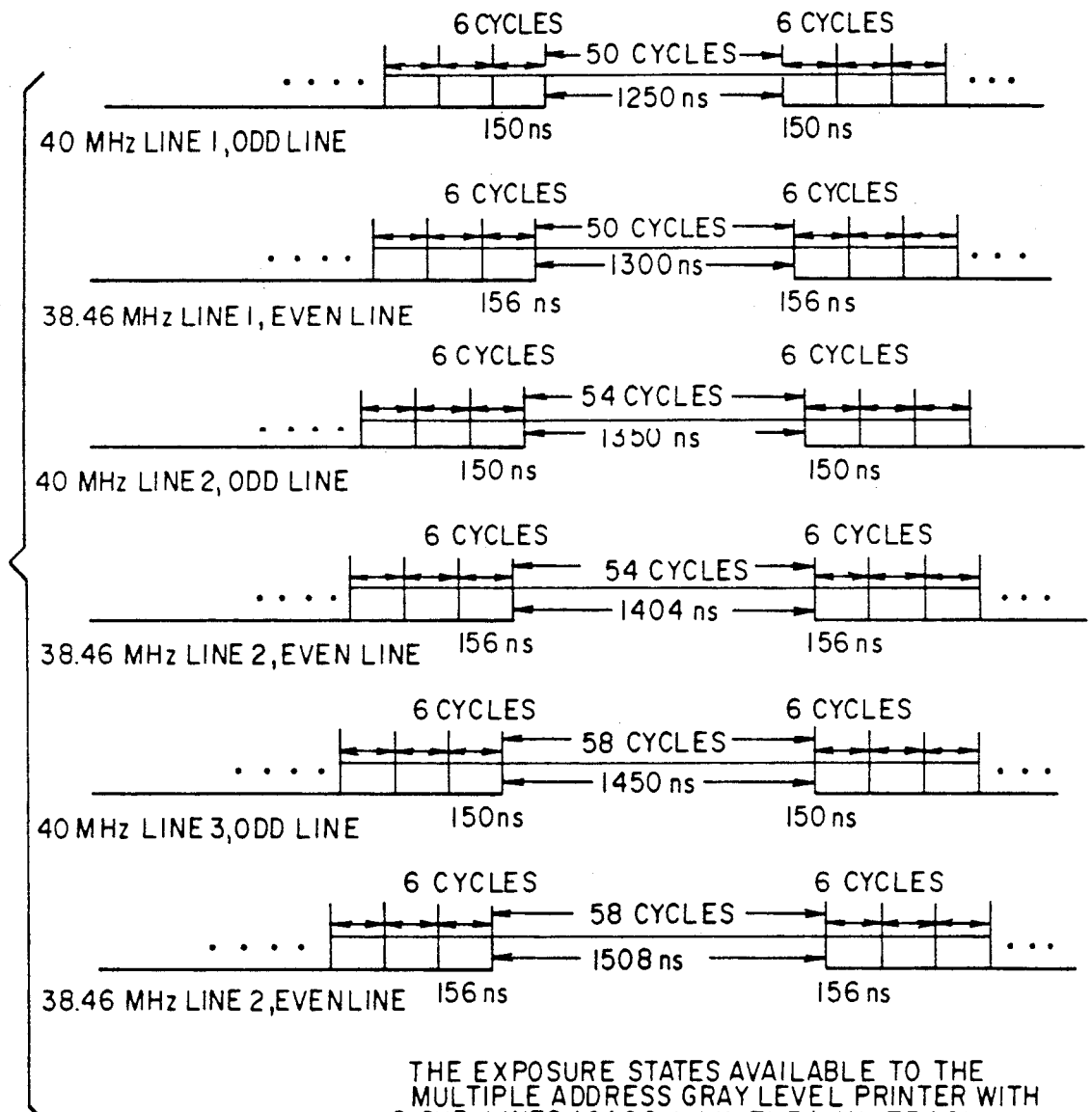
FIG. 21 is another sketch of exposure states available in recording a pixel using six sub-lines of exposure and two master clocks.

In FIG. 21, there is illustrated the possible exposure states for all 6 sub-lines in the context of a center pulsewidth modulation scheme. Each sub-line can have a total of 63 states (exposure time choices) for a 6 bits/-pixel 400 dpi printhead. We start out from an exposure clock cycle of 50 because if one uses a lower exposure time than 1000 ns, one may run into rise time and fall time problems of the printhead. If the exposure time is more than that (like in a 40 MHz line, 50 clock cycle state gives 1250 ns exposure), then the variation of the exposure time between states will not be affected by the rise time or fall time. Since there are three sub-lines that are using the 40 MHz master clock frequency and three other sub-lines that are using the 38.46 MHz master clock frequency, we have a total of 189 states available for each frequency. This produces a range of from 50 clock cycles to 802 clock cycles exposure time possiblity for each master clock frequency since the minimum difference between two available states is 4 clock cycles as shown in the table of FIG. 20a (see for example column B available states are 50, 54, 58).

Figure 22:
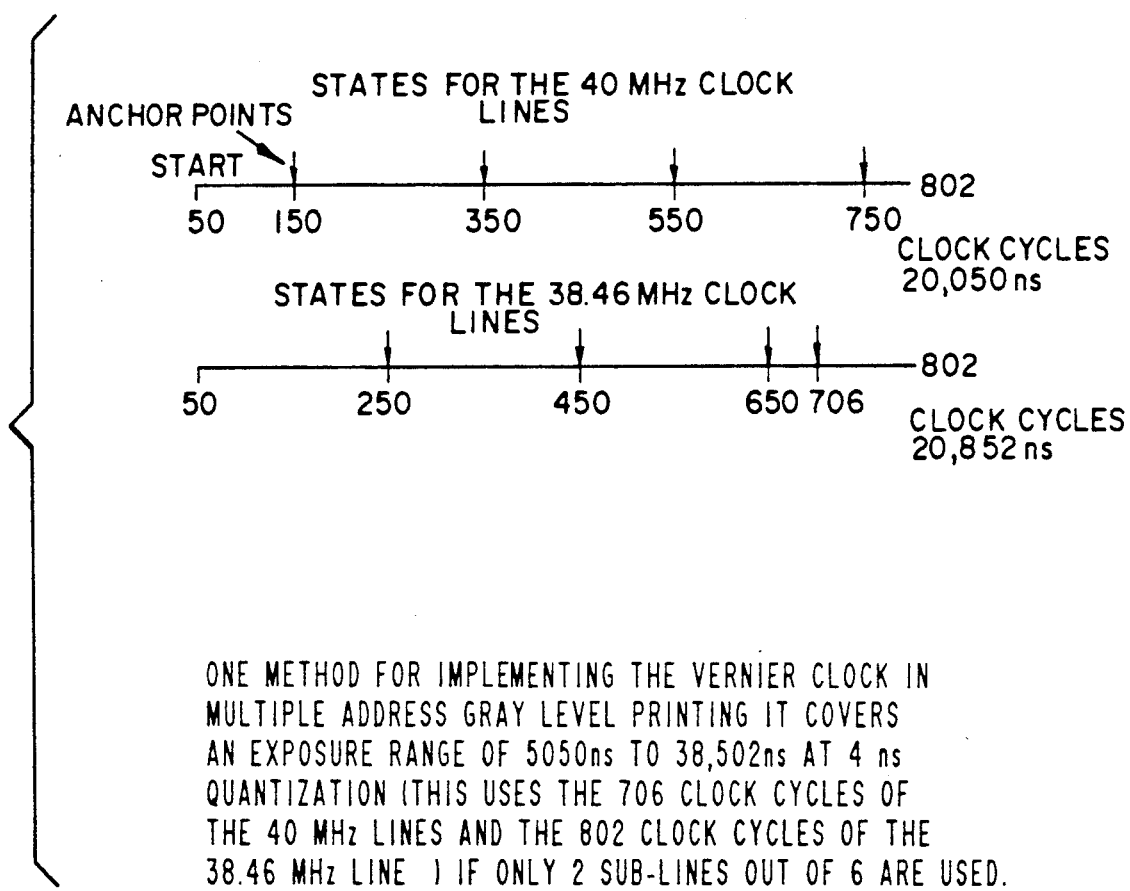

In order to implement a vernier clock scheme which has a wide breadth of exposure range, we can use the following method to calculate sub-line exposure times. The concept of this is illustrated in FIGS. 22–23 where we shall use this to get an exposure range from 5050 ns to 38,502 ns at 4 ns intervals by using only two out of the six available exposure sub-lines. The arrows on FIG. 22 marks what I will call anchor points. I start with the first anchor point at the 150 clock cycles of the 40 MHz line. The detail of how this is down is shown in FIG. 23, steps a–j.

Figure 24A:
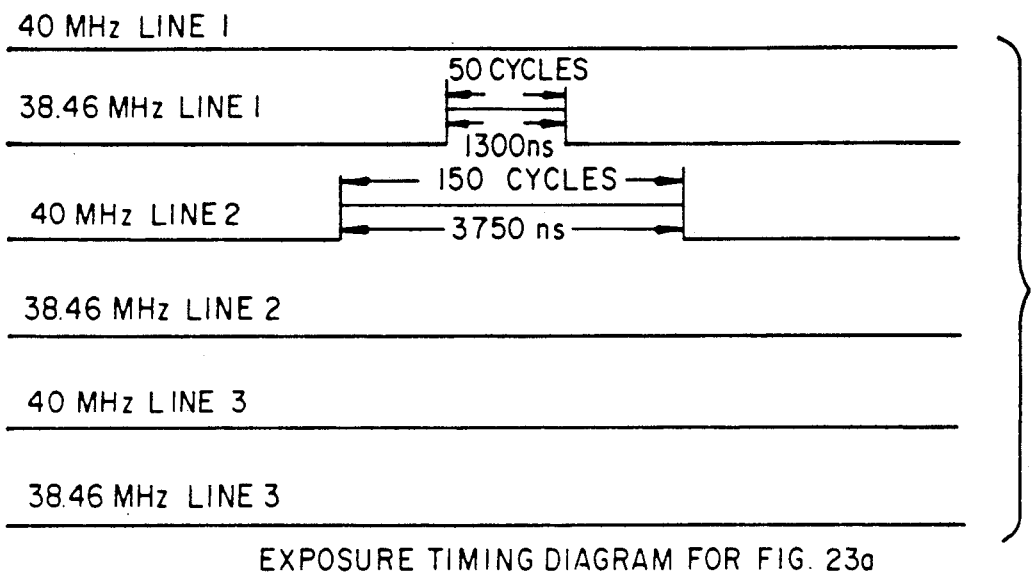

In the first step (anchor), I "anchor" the 40 MHz line at the 150 clock cycles and use the 50 clock cycles for the 38.46 MHz line to form a combined exposure of 5,050 ns as shown in FIG. 23, step a (see also FIG. 24a).

Then in the second step or step b to calculate the respective exposures for the two sub-lines providing a total exposure of 5054 ns, I slide the 40 MHz line exposure to the next lower exposure state (in this case, the 146 clock cycles) as well as sliding the 38.46 MHz line exposure to the next higher exposure state (in this case, the 54 clock cycles) as shown in step b to get a combined exposure time of 5,054 ns. This combined exposure is 4 ns more than that in step a. I continue the same procedure of sliding 25 times until I get to a situation like in step c. Here, the 40 MHz line is in the 50 clock cycles and the 38.46 MHz line is at the 150 clock cycles and I have a combined exposure time of 5,150 ns which is exactly 100 ns more than when we started in step a. In between the states as indicated in step a and step c, we have 25 exposure combinations which are 4 ns apart. As one may also notice from the table of FIG. 20a, the difference in exposure time between available states of exposure in the 38.46 MHz line is always 104 ns.

The third stage of the method (advance) is shown in step d. Here, I anchor the 40 MHz line to the 150 clock cycles and advance the 38.46 MHz line state from the 50 clock cycles to 54 clock cycles and I get a combined exposure of 5,154 ns which is again 4 ns more than that in step c. We repeat the same procedure of sliding again just like that described in steps b and c. After this sliding action was done 25 times, we use the advance stage again. This procedure continues until we get to the next anchor point (the 38.46 MHz line is at the 250 clock cycles while the 40 MHz line is at the 150 clock cycles anchor). Then under this circumstance, the sliding is done only 24 times instead of the usual 25 times, we get to the state as shown in step e. Here, the 40 MHz line is at the 54 clock cycles and the 38.46 MHz line is at the 346 clock cycles. This gives a combined exposure of 10,346 ns.

In the fourth stage of the method (switch) the 40 MHz line anchor point will be switched to the 38.46 MHz anchor point as shown in step f. Here the anchor point for the 38.46 MHz line is the 250 clock cycles as shown in FIG. 22. The starting point for the 40 MHz line will be at the 154 clock cycles (it advances from the 150 clock cycles) and the combined exposure is 10,350 ns which is again 4 ns more than that in step e. I now repeat the procedure of sliding as shown in step g which is very similar to that in step b. The only difference is the sliding is only repeated 24 times instead of 25 times before the next stage (advance) occurs as shown in steps h and i. The reason being that at 4 ns apart, 24 times gives us 96 ns and one notices from the table of FIG. 20a that the available states for the 40 MHz lines are 100 ns apart. So this method will make the combined exposure time increase between states "seamless" or of providing uniform jumps on exposure time.

This procedure of anchor-slide advance continues until we get to another of the anchor points (i.e., when the 40 MHz line is at the 350 clock cycles and the 38.46 MHz clock line is at the 250 clock cycles), then the sliding procedure is done 25 times instead of 24 times before the switching of the anchor point from the 38.46 MHz line (250 clock cycles) to the 40 MHz line (350 clock cycles) occurs as shown in step j. This procedure continues until we get to the last clock state as indicated in FIG. 22. Note I have used the 706 clock cycles of the 40 MHz line and the 802 clock cycles of the 38.46 MHz line to get a combined exposure time of 38,502 ns. The anchor points for the 40 MHz line are 150, 350, 550 and 750 clock cycles. The anchor points for the 38.46 MHz line are 250, 450, 650 and 706 clock cycles. So the switching of the anchor points may go as follows: 150 clock cycles (40 MHz), 250 clock cycles (38.46 MHz), 350 clock cycles (40 MHz), 450 clock cycles (38.46 MHz), 550 clock cycles (40 MHz), 650 clock cycles (38.46 MHz), 750 clock cycles (40 MHz), 706 clock cycles (38.46 MHz).

Figure 24B:
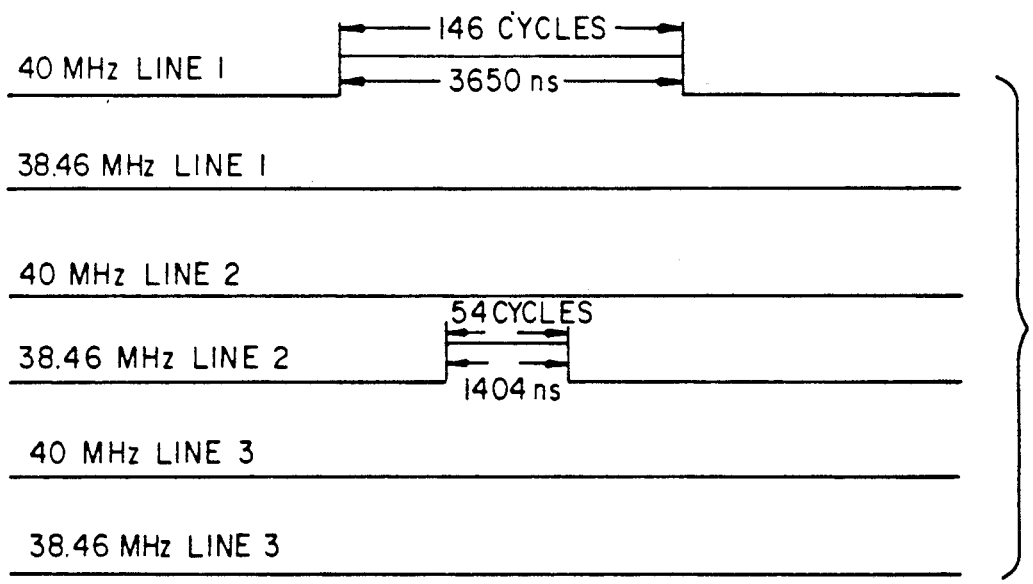

In all of the above cases, only two sub-lines out of six available ones are used to generate 8,364 exposure combinations states at 4 ns quantization from 5,050 ns to 38,502 ns. To clarify how the exposure time on each of the sub-lines look, I show the case for step a in an exposure time timing diagram in FIG. 24a. The combined exposure time is then 5,050 ns. The next state which is the concept of step b is shown in the timing diagram of FIG. 24b with a combined exposure of 5,054 ns. Notice only two exposure sub-lines are used in this case and each of the sub-lines are 1/2400 inch apart in the in-track direction, i.e., direction of movement of the image receiver medium. Encoder means may be provided to detect movement of the image receiver medium to signal to the LCU each increment of movement of the medium. Alternatively, the LCU, knowing the nominal speed of the medium, may calculate the incremental movement and provide the signals accordingly.

Figure 24C:
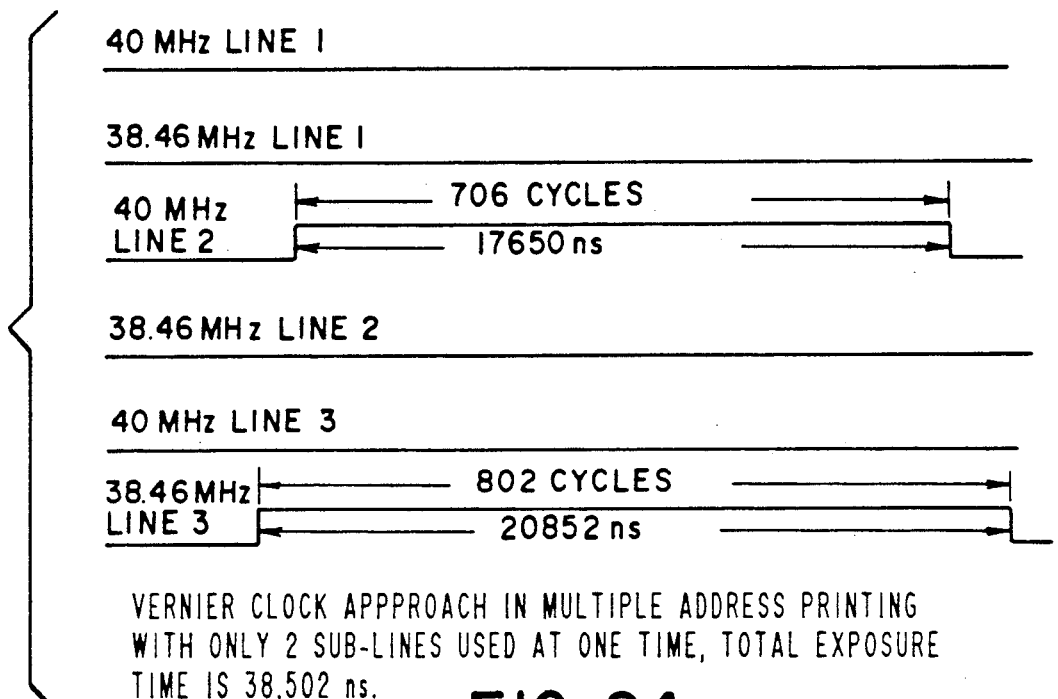
Figure 24D:
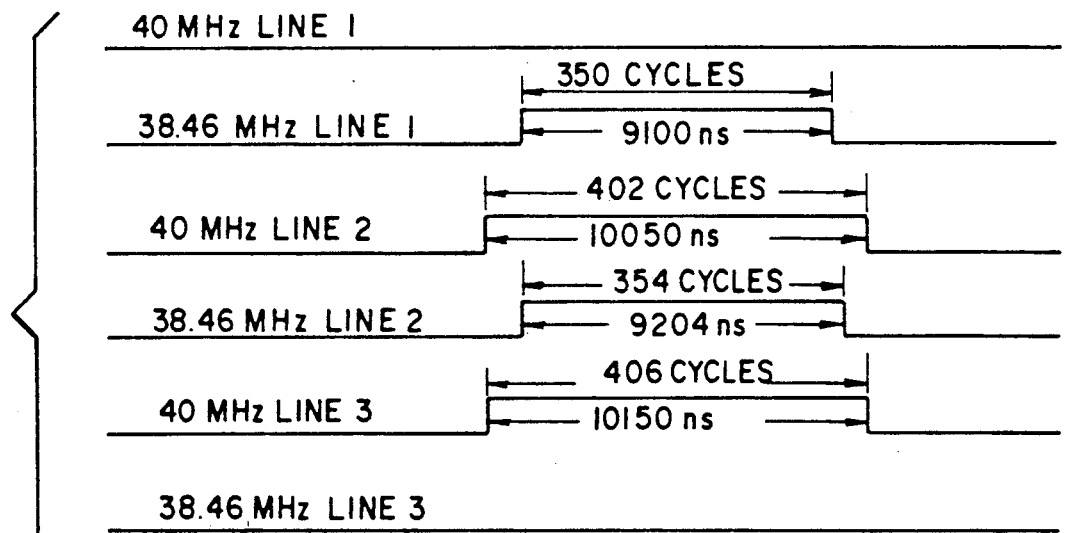

Now if it is required to extend the exposure range beyond 38,502 ns, one may use more than two sub-lines. In FIGS. 24c and 24d, I have shown how to do that when one goes from 2 sub-lines into a 4 sub-lines exposure. In FIG. 24c, we are at the last stage of 2 sub-lines of exposure (namely, the 40 MHz line is at the 706 cycles and the 38.46 MHz line is at 802 cycles to give us a combined exposure time of 38,502 ns). In FIG. 24d, I use four exposure sub-lines (for the 40 MHz lines, I use 402 cycles and 406 cycles; for the 38.46 MHz lines, I use 350 cycles and 354 cycles) to form a combined exposure time of 38,504 ns which is 2 ns more than that in FIG. 24c. Notice also that in this scheme we cannot have two different exposure times on the same sub-lines simultaneously in the same sub-pixel or two exposure times of the same duration within the group of six sub-lines.

Figure 24E:
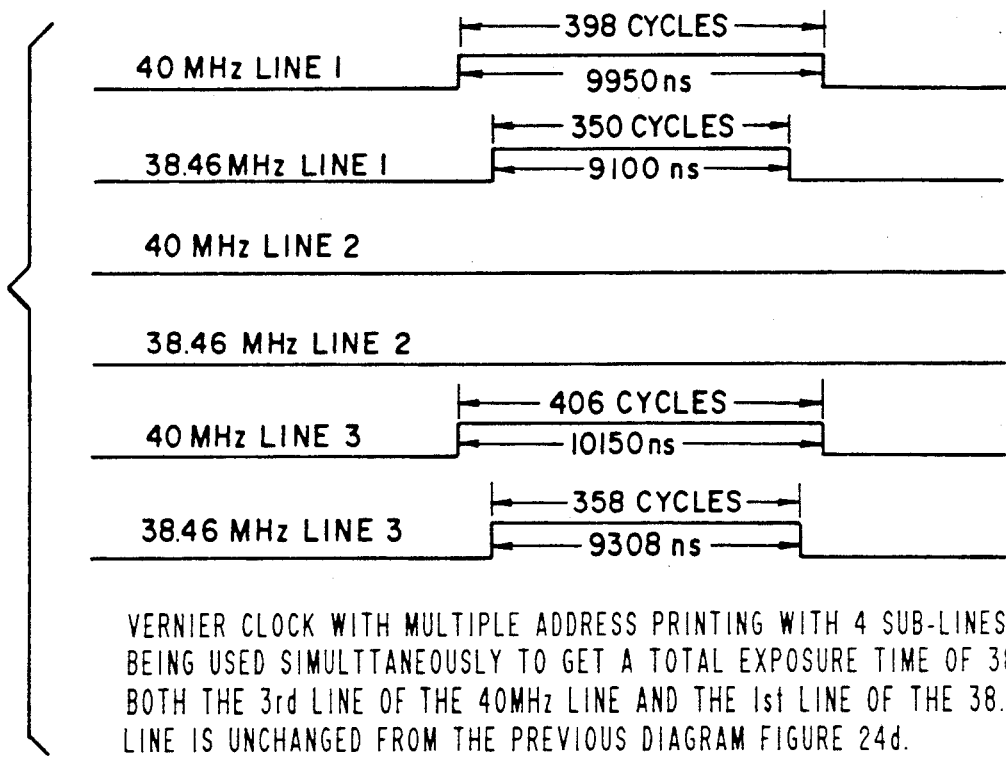
Figure 24F:
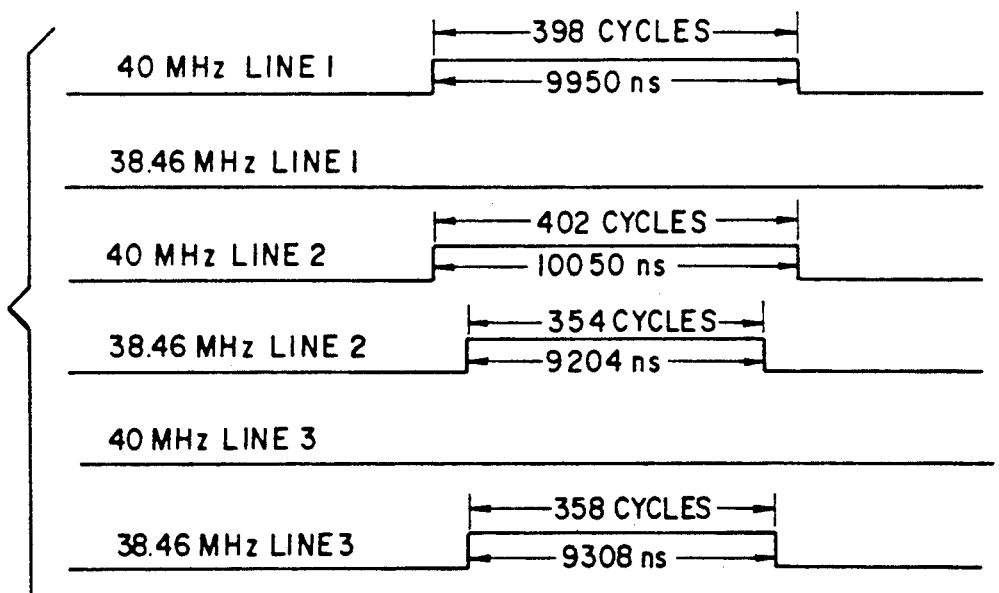

Now to form a seamless exposure increment of 4 ns steps, I use a similar method as described before. The starting anchor points are the states 350 and 354 for the 38.46 MHz line as shown in FIG. 24d (anchor). I decrease the 40 MHz line to the next lower available state and increase the 38.46 MHz line to the next higher state as shown in FIG. 24e for the next exposure combination. In FIG. 24e, I am using the 398 and 406 cycles of the 40 MHz line and the 350 and 358 cycles of the 38.46 MHz line to get a combined exposure of 38,508 ns which is 4 ns more than the case in FIG. 24d. Note that when I have decreased the 40 MHz line to the next lower state, I decrease the 402 cycles on line 2 to the 398 cycles on line 1 rather than lowering the 406 cycles on line 3 to the 402 cycles on line 2 because line 2 already is used (see FIGS. 24d and 24e for further details). The same thing goes for the increasing of the 38.46 MHz line state of changing from the combination of (350 cycles on line 1 and 354 cycles on line 2) to the combination of (350 cycles on line 1 and 354 cycles on line 3). This will become clearer in the next step as shown in FIG. 24f when the next slide action combination of the 40 MHz line is decreasing the exposure from 398 cycles on line 1 and 406 cycles in line 3 in FIG. 24e to 398 cycles on line 1 and 402 cycles on line 2 in FIG. 24f and the 38.46 MHz line is increasing the exposure from 350 cycles in line 1 and 358 cycles on line 3 to 354 cycles on line 2 and 358 cycles on line 3 to get a combined exposure time of 38,512 ns. This exposure time in FIG. 24f is again 4 ns more than that in FIG. 24e. Of course, if one wants to use an 8 ns quantization, one can just slide both sub-lines of each master clock lines simultaneously.

Figure 24I:
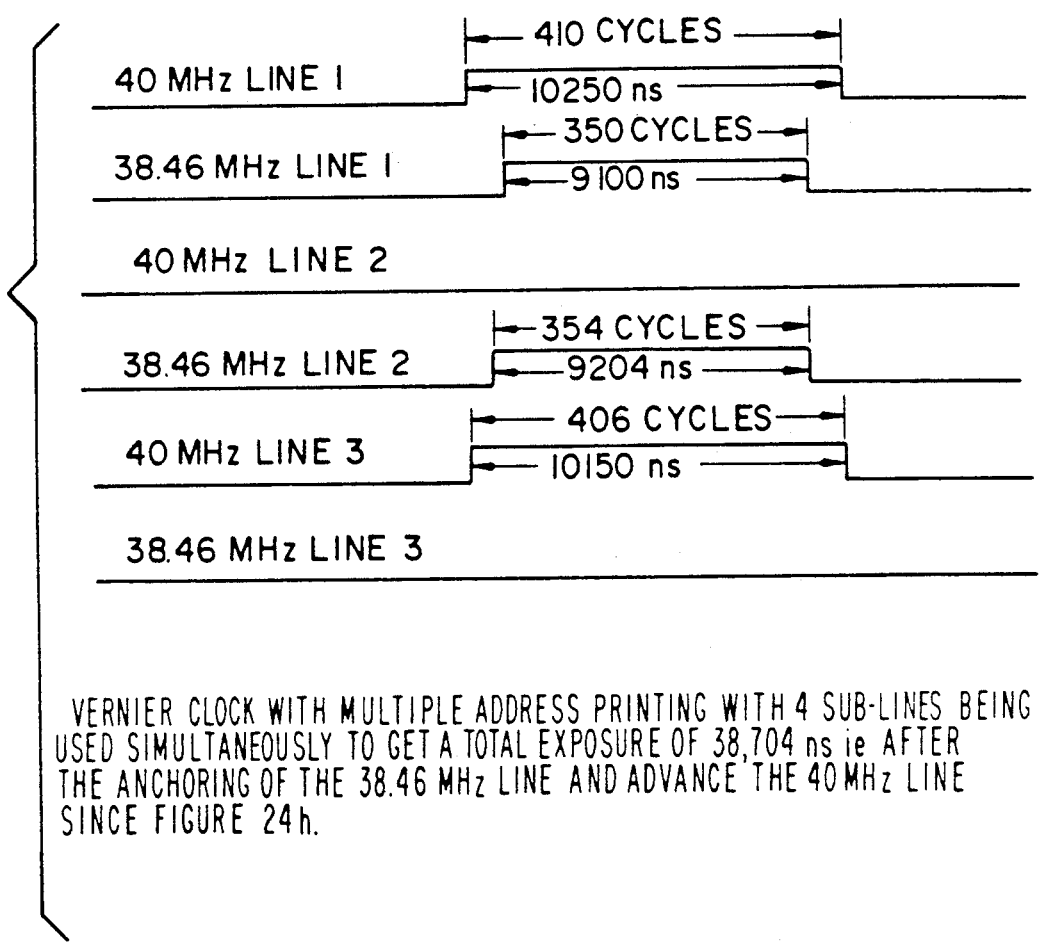
Figure 24J:
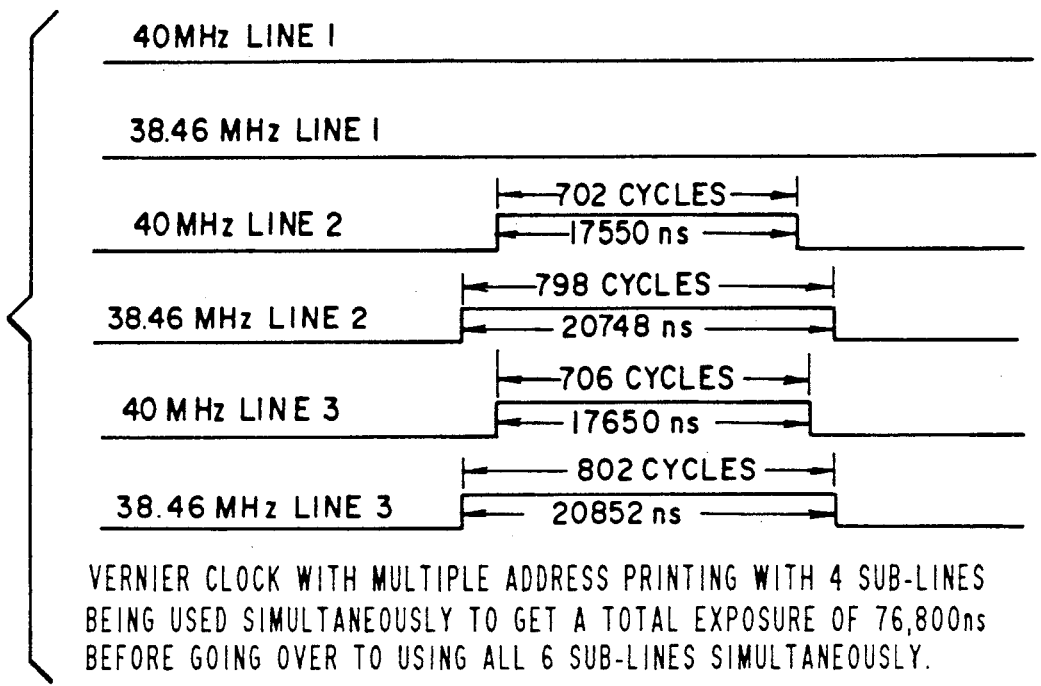

If one continues the previously described method of sliding and repeat that 24 times, one gets to the state as defined by FIG. 24g. I now have a combined exposure time of 38,696 ns which is 192 ns more than that in FIG. 24d. I need 4 ns more before I re-anchor at the 38.48 MHz line and advance the state in the 40 MHz line. This is accomplished in FIG. 24h with a combined exposure time of 38,700 ns. Now the next step (anchor-advance) is shown in FIG. 24i where I re-anchor at the 38.46 MHz lines at 350 cycles and 354 cycles like that in FIG. 24d and advance the 40 MHz lines to 406 and 410 cycles. I have now advanced 200 ns from FIG. 24d with 50 states in between them that is quantized to 4 ns. Then I use the same method of sliding/re-anchoring/advance again until I get to the next anchor point for the 40 MHz line. Then the anchor will switch from the 38.46 MHz line to the 40 MHz line and the whole procedure starts over again similar to that in the 2 sub-lines exposure case (like when I used the 40 MHz as anchors, I slide 25 times instead of 24 times, etc.). This procedure continues until I get to a configuration like that in FIG. 24j. In FIG. 24j, I am using the 702 and 706 cycles for the 40 MHz line and the 798 and 802 cycles for the 38.46 MHz line to give a combined exposure time of 76,800 ns. Therefore, one has created another 9,575 exposure steps between 38,504 ns to 76,800 ns at 4 ns quantization. The anchor points can be at a similar place as the two sub-line exposure case. In the above, I have shown a method for creating a total of 17,939 exposure steps between 5,050 ns to 76,800 ns at 4 ns quantization.

Figure 24K:
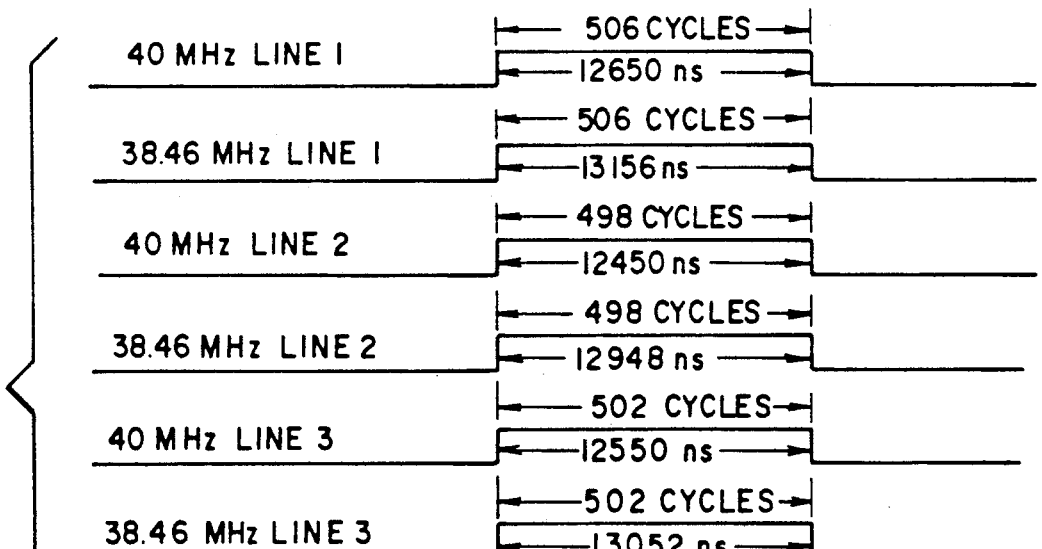

If one wants to expand that exposure range further, we can use all six sub-lines at 1/2400 inch apart as shown in FIG. 24k. For the 40 MHz line, I have used the 506 cycles on line 1, 498 cycles on line 2 and 502 cycles on line 3 to get a combined exposure time of 76,806 ns which is 6 ns more than that in FIG. 24j. Although I still can use the above-described method, I now have to move the sub-lines to the next state which is 12 clock cycles away as shown in the table of FIG. 20 so our quantization has increased to 12 ns between exposure states as shown in FIG. 24l. In FIG. 24l for the 40 MHz line, the clock cycles of (494 on line 1, 498 on line 2 and 502 on line 3) is used compared with (506 on line 1, 498 on line 2 and 502 on line 3 in FIG. 24k); also in FIG. 24l, for the 38.46 MHz line, the clock cycles of (506 on line 1, 510 on line 2 and 502 on line 3) are used in FIG. 24k. In this case, the anchor is the 40 MHz line on 498, 502 and 506 cycles. So I get a combined exposure time of 76,818 ns which is 12 ns more than that in FIG. 24k. I can apply the same principle of this method to these six sub-lines exposure scheme as shown in FIG. 24m and 24n all the way to the last state (698, 702 and 706 in the 40 MHz line and 794, 798, and 802 for the 38.46 MHz line) which gives a combined exposure time of 114,894 ns. This produces 3,175 exposure steps from 76,806 ns to 114,894 ns at 12 ns quantization steps. So with the above method, I have created a total of 21,114 exposure states of very fine quantization steps (4 to 12 ns) from 5,050 ns to 114,894 ns total exposure with only 189 exposure states for each of the master clock lines.

The above illustrated determined states for each sub-line may be stored in the LCU and used to control the output of the pulses from the programmable clock or clocks 33, 33', or 33" (FIG. 15). The look-up table memory 16 under control of the LCU may be programmed to transform a 4-bits/pixel 1/400"×1/400" pixel into a suitable set of six-bit exposures for recording by a particular LED on particular multiple sub-lines of a recording medium used to record the pixel to provide firmer control over LED uniformity over the full exposure range than that suggested by the prior art.

I have shown a way to use multiple address grey level printing to bypass some of the printhead limitations as well as master clock frequency limitations. Improved uniformity corection on the LED printhead and many more grey levels per pixel are possible by using the combination of exposure states in the two different frequency clock lines.

Still further modifications are the possible use of a non-linear exposure vernier clocking scheme. The use of a non-linear exposure clock was illustrated in prior art FIG. 3. A set of clock pulses is output by programmable clock 33 that includes groups of pulses wherein there is linearity within the group or the pulses within the group are identical but differ in frequency from group to group. This has been described as being piecewise linear. With reference to FIG. 20b, it may be seen that for each sub-line, the clock pulses from programmable clocks 33 and 33' are linear. Within each line, the pulses are uniformly six-clock cycles apart. However, a piecewise linear approach may be incorporated wherein for the higher count numbered pulses they may be made more than six-clock cycles apart to provide greater exposure range. This is accomplished by selecting appropriate 12-bit words into the 12-bit counter as described for the embodiment of FIG. 3.

In the cross-referenced application filed concurrently herewith in the name of Eric Zeise, there is described the use of different master clocks for count-up and count-down. A scheme such as this may also be used in my invention.

There has thus been described a method and apparatus for dot printing wherein a multiple addressability within a pixel is employed for generating exposure pulses with varying periodicity to create an exposure space that provides fine gradations of exposure with efficient use of data.

The invention has been described in detail with particular reference to preferred embodiments thereof, but it will be understood that variations and modifications can be effected within the spirit and scope of the invention.

I claim:

1. An apparatus for recording images upon an image receptor, the apparatus comprising:
   a recording head having a plural number N of point-like recording elements per inch extending so as to record along a line, the recording head emitting a line of dot recording emissions in response to data signals;
   control means including means for providing data signals to the recording head for exposing M sub-lines per inch on the image receptor to record an image with a resolution of N×M dots per square inch, N and M being numbers greater than one and M being greater than N; and
   wherein the control means further includes master clock means emitting pulses of first and second frequencies and means for controlling the duration of the emissions from the recording elements by controlling a recording element during one sub-line of recording in response to a plurality of pulses of the first frequency from the master clock means and controlling the same recording element during a next sub-line of recording in response to a plurality of pulses of the second frequency from the master clock means.

2. The apparatus of claim 1 and wherein the control means includes counter means for counting clock pulses derived from the master clock means and generating a multibit count signal and comparator means for comparing a multibit data signal for each sub-line with the count signal to determine a duration of driving a recording element.

3. The apparatus of claim 2 and including programmable clock means for counting regular clock pulses from the master clock means and generating non-regular clock pulse signals for counting by said counting means.

4. The apparatus of claims 2 or 3 and including means for alternatively selecting on a sub-line basis the multibit count signals based on the clock pulses of the different master clock frequencies so that duration for driving of a recording element is responsive to signals related to master clock pulses of one frequency for recording one sub-line and is responsive to signals related to master clock pulses of another frequency for recording a second sub-line.

5. The apparatus of claim 4 and wherein the multibit data signal for each sub-line comprises grey level information and correction information for balancing the duration of emission of the recording element.

6. The apparatus of claim 2 or 3 and wherein the multibit data signal for each sub-line comprises grey level information and correction information for balancing the duration of emission of the recording element.

7. An apparatus for recording images upon an image receptor, the apparatus comprising:
a recording element for emitting radiation for recording on the image receptor, first means for driving the recording element to record a picture element; the picture element being formed by a series of emissions from the recording element imaged upon successive sub-lines of the image receptor; second means for controlling the duration during each sub-line of an emission from the recording element for recording said picture element, said second means including master clock means for generating clock pulses at first and second frequencies, counter means for counting clock pulses derived from the master clock means by counting signal pulses derived from clock pulses of the first frequency during recording of one sub-line of said picture element and by counting signal pulses derived from the clock pulses of the second frequency during recording of another sub-line of said picture element and generating a multibit count signal and comparator means for comparing a multibit data signal for each sub-line with the count signal to determine a duration for driving of the recording element.

8. The apparatus of claim 7 and including programmable clock means for counting regular clock pulses from the master clock means and generating non-regular clock pulse signals for counting by said counting means.

9. The apparatus of claims 7 or 8 and wherein the multibit data signal for each sub-line comprises grey level information and correction information for balancing the duration of emission of the recording element.

10. In a recording apparatus, the apparatus comprising:
an image receptor;
digital counting means having a plurality of output lines having signals thereon representing in digital form a time changing numerical count during a count mode;
clock means coupled to the digital counting means for changing the count represented by the signals on the output lines;
comparator means coupled to the output lines and comparing the time changing count with each of several different predetermined counts and generating respective waveform pulses, the durations of each of which are related to a respective predetermined count;
a recording head having a plural number N of point-like recording elements per inch extending so as to record along a line upon said image receptor, the recording head including drive means for driving said recording elements to emit a line of dot recording emissions in response to data signals and characterized by;
control means including means coupled to the recording head for providing data signals to the recording head for exposing M sub-lines per inch on the image receptor with a resolution of N×M dots per square inch, N and M being numbers greater than one and M being greater than N.

11. The apparatus of claim 10 and wherein the clock means emits pulses of first and second frequencies and means for controlling the duration of the emissions from the recording elements by controlling a recording element during one sub-line of recording in response to a plurality of pulses of the first frequency from the clock means and controlling the same recording element during a next sub-line of recording in response to a plurality of pulses of the second frequency from the clock means.

12. A method for recording images upon an image receptor, the method comprising the steps of:
providing a recording head having a plural number N of point-like recording elements per inch extending so as to record along a line, the recording head emitting a line of dot recording emissions in response to data signals;
providing data signals to the recording head for exposing M sub-lines per inch on the image receptor for recording an image with a resolution of N×M dots per square inch, N and M being numbers greater than one and M being greater than N; and
controlling the duration of the emissions from the recording elements by controlling a recording element during one sub-line of recording in response to a plurality of pulses of a first frequency from a master clock means and controlling the same recording element during a next sub-line of recording in response to a plurality of pulses of the second frequency from the master clock means.

13. The method of claim 12 and wherein in the step of controlling, a counter means counts clock pulses derived from the master clock means and generates a multibit count signal and a comparator means compares a multibit data signal for each sub-line with the count signal to determine a duration of driving a recording element.

14. The method of claims 12 or 13 and wherein the multibit data signal for each sub-line comprises grey level information and correction information for balancing the duration of emission of the recording element.

15. A method for recording images upon an image receptor, the method comprising the steps of:
providing a recording element for emitting radiation for recording on the image receptor, driving the recording element to record a picture element; the picture element being formed by a series of emissions from the recording element imaged upon successive sub-lines of the image receptor; controlling the duration during each sub-line of an emission from the recording element for recording said picture element; generating clock pulses at first and second frequencies from a master clock means, counting clock pulses derived from the master clock means by counting signal pulses derived from clock pulses of the first frequency during recording of one sub-line of said picture element and by counting signal pulses derived from the clock pulses of the second frequency during recording of another sub-line of said picture element and generating a multibit count signal; and comparing a multibit data signal for each sub-line with the count signal to determine a duration for driving of the recording element.

16. The method of claim 15 and wherein the multibit data signal for each sub-line comprises grey level information and correction information for balancing the duration of emission of the recording element.

17. In a method of recording the method comprising:

generating upon the output lines of a digital counting means a plurality of signals representing in digital form a time changing numerical count during a count mode;

generating clock pulses at the input of the counting means to change the count represented by the signals on the output lines;

comparing the time changing count with each of several different predetermined counts and generating respective waveform pulses, the durations of each of which are related to a respective predetermined count;

driving recording elements upon a recording head having a plural number N of point-like recording elements per inch extending so as to record along a line upon an image receptor, the recording elements emitting a line of dot recording emissions in response to data signals; and characterized by providing data signals to the recording head for exposing M sub-lines per inch on the image receptor with a resolution of N×M dots per square inch, N and M being numbers greater than one and M being greater than N.

18. The method of claim 17 and further including the steps of generating from the clock means pulses of first and second frequencies and controlling the duration of the emissions from the recording elements by controlling a recording element during one sub-line of recording in response to a plurality of pulses of the first frequency from the master clock means and controlling the same recording element during a next sub-line of recording in response to a plurality of pulses of the second frequency from the master clock means.

19. The method of claims 17 or 18 and wherein the time-changing count for one sub-line represents a set of numbers of clock cycles of the clock means and wherein the time-changing count of a next successive sub-line represents a different set of numbers of clock cycles.

20. The method of claim 19 and wherein the pre-determined counts each represent multibit signals representing grey level image data.

21. The method of claims 17 or 18 and wherein the pre-determined counts each represent multibit signals representing grey level image data.

22. A method of recording grey level pixels, the method comprising dividing the exposure for recording a pixel into a plurality of sub-line exposures for recording said pixel; and on the recording of said sub-lines employing a multibit data signal to control the exposure on said sub-line for a period related to said multibit data signal, the multibit data signal for one sub-line being different than that used for controlling exposure on at least one other sub-line used for recording said pixel.

23. The method of claim 22 and wherein the multibit signal for controlling recording on each sub-line represents a number of clock pulses of a clock.

24. The method of claims 22 or 23 and wherein the frequency of clock pulses on one sub-line is different from that used on another sub-line in the recording of a pixel.

25. An apparatus for recording recording grey level pixels, the apparatus comprising:

means for dividing the exposure for recording a pixel into a plurality of sub-line exposures for recording said pixel; and means for generating a multibit data signal to control the exposure on said sub-line for a period related to said multibit data signal, the multibit data signal for one sub-line being different than that used for controlling exposure on at least one other sub-line used for recording said pixel.

26. The apparatus of claim 25 and including clock means for generating clock pulses and wherein the multibit data signal for controlling recording on each sub-line represents a number of clock pulses of the clock means.

27. The apparatus of claims 25 or 26 and wherein the clock means generates, during recording of one sub-line, clock pulses having a frequency different from that used for recording on another sub-line in the recording of the same pixel.

* * * * *